(12) United States Patent
Thangaraj et al.

(10) Patent No.: US 9,946,473 B2
(45) Date of Patent: Apr. 17, 2018

(54) EFFICIENTLY MANAGING UNMAPPED BLOCKS TO EXTEND LIFE OF SOLID STATE DRIVE

(71) Applicant: SanDisk Technologies LLC, Plano, TX (US)

(72) Inventors: Senthil M. Thangaraj, Fremont, CA (US); Divya Reddy, Milpitas, CA (US); Aaron K. Olbrich, Morgan Hill, CA (US)

(73) Assignee: SanDisk Technologies LLC, Plano, TX (US)

( * ) Notice: Subject to any disclaimer, the term of this patent is extended or adjusted under 35 U.S.C. 154(b) by 0 days.

(21) Appl. No.: 15/157,369

(22) Filed: May 17, 2016

(65) Prior Publication Data

US 2017/0160957 A1   Jun. 8, 2017

Related U.S. Application Data

(60) Provisional application No. 62/262,765, filed on Dec. 3, 2015.

(51) Int. Cl.
G06F 3/06 (2006.01)

(52) U.S. Cl.
CPC ............ *G06F 3/0616* (2013.01); *G06F 3/064* (2013.01); *G06F 3/0652* (2013.01); *G06F 3/0679* (2013.01); *G06F 3/0688* (2013.01)

(58) Field of Classification Search
CPC ....... G06F 3/0616; G06F 3/064; G06F 3/0679
See application file for complete search history.

(56) References Cited

U.S. PATENT DOCUMENTS 5,524,231 A   6/1996  Brown
5,953,255 A   9/1999  Lee
(Continued)

FOREIGN PATENT DOCUMENTS

WO   WO 2011/031903   3/2011
WO   WO 2012/148828   11/2012
WO   WO 2012/174216   12/2012

OTHER PUBLICATIONS

Kgil et al., "Improving NAND Flash Based Disk Cached", ISCA '08, 35th International Symposium on Computer Architecture, Jun. 21, 2008, 12 pages.
(Continued)

*Primary Examiner* — David X Yi
*Assistant Examiner* — Zubair Ahmed
(74) *Attorney, Agent, or Firm* — Brinks Gilson & Lione

(57) ABSTRACT

Systems and methods disclosed herein allow for efficiently managing unmapped blocks to extend life of solid-state drives. In one aspect, a method includes: determining a quantity of unmapped storage units in the storage device and operating the storage device in a first mode of operation while the quantity satisfies a first threshold. The method also includes: changing to a second mode of operation if the quantity of unmapped storage units doesn't satisfy the first threshold. While operating in the second mode of operation, the method includes: determining whether processing a write command would reduce the quantity of unmapped storage units to a quantity less than a second threshold. If processing the write command wouldn't reduce the quantity of unmapped storage units to a quantity less than the second threshold, the method includes: accepting and processing the write command. Else, the method includes: forgoing acceptance and processing of the write command.

20 Claims, 16 Drawing Sheets

(56) References Cited

U.S. PATENT DOCUMENTS

| | | |
|---|---|---|
| 7,609,561 B2 | 10/2009 | Cornwell et al. |
| 7,743,203 B2 | 6/2010 | France |
| 7,761,678 B1 | 7/2010 | Bodmer et al. |
| 7,962,695 B2 | 6/2011 | Faucher et al. |
| 8,711,665 B1 | 4/2014 | Abdul Hamid |
| 8,761,108 B2 | 6/2014 | Ren et al. |
| 8,793,556 B1 | 7/2014 | Northcott et al. |
| 8,898,548 B1 | 11/2014 | Mullendore et al. |
| 9,021,333 B1 | 4/2015 | Northcott |
| 9,021,336 B1 | 4/2015 | Northcott |
| 9,292,440 B2 | 3/2016 | Shalvi et al. |
| 2003/0051090 A1 | 3/2003 | Bonnett et al. |
| 2005/0172068 A1 | 8/2005 | Sukegawa |
| 2006/0158933 A1 | 7/2006 | Ryu |
| 2008/0112222 A1 | 5/2008 | Shirakawa |
| 2008/0159007 A1 | 7/2008 | Sekar et al. |
| 2008/0163031 A1 | 7/2008 | Hsieh et al. |
| 2008/0235432 A1 | 9/2008 | Chen et al. |
| 2008/0320214 A1 | 12/2008 | Ma et al. |
| 2009/0046509 A1 | 2/2009 | Annavajjhala et al. |
| 2009/0240873 A1 | 9/2009 | Yu et al. |
| 2009/0300269 A1 | 12/2009 | Radke et al. |
| 2009/0319720 A1 | 12/2009 | Stefanus et al. |
| 2010/0008140 A1 | 1/2010 | Lee |
| 2010/0017557 A1 | 1/2010 | Nakanishi et al. |
| 2010/0023682 A1 | 1/2010 | Lee et al. |
| 2010/0306580 A1 | 12/2010 | McKean et al. |
| 2010/0332895 A1 | 12/2010 | Billing et al. |
| 2010/0332922 A1 | 12/2010 | Chang et al. |
| 2010/0332950 A1 | 12/2010 | Billing et al. |
| 2011/0099321 A1 | 4/2011 | Haines et al. |
| 2011/0199833 A1 | 8/2011 | Shim et al. |
| 2011/0209031 A1 | 8/2011 | Kim et al. |
| 2011/0219259 A1 | 9/2011 | Frost et al. |
| 2011/0302477 A1 | 12/2011 | Goss et al. |
| 2012/0005451 A1 | 1/2012 | Lee et al. |
| 2012/0023285 A1 | 1/2012 | Kim |
| 2012/0144110 A1 | 6/2012 | Smith |
| 2012/0240012 A1 | 9/2012 | Weathers et al. |
| 2012/0300527 A1 | 11/2012 | Shim et al. |
| 2013/0086454 A1 | 4/2013 | Rub |
| 2013/0138870 A1 | 5/2013 | Yoon et al. |
| 2013/0170297 A1 | 7/2013 | Nam et al. |
| 2013/0176784 A1 | 7/2013 | Cometti et al. |
| 2013/0242667 A1 | 9/2013 | Shim et al. |
| 2014/0006688 A1 | 1/2014 | Yu et al. |
| 2014/0052925 A1 | 2/2014 | Kotzur et al. |
| 2014/0089565 A1 | 3/2014 | Lee et al. |
| 2014/0122787 A1 | 5/2014 | Shalvi et al. |
| 2014/0136927 A1 | 5/2014 | Li et al. |
| 2014/0149641 A1 | 5/2014 | Avila et al. |
| 2014/0181369 A1 | 6/2014 | Horn |
| 2014/0189421 A1 | 7/2014 | Werner et al. |
| 2014/0281126 A1 | 9/2014 | Bleyer et al. |
| 2014/0281152 A1 | 9/2014 | Karamcheti et al. |
| 2014/0351486 A1 | 11/2014 | Baryudin |
| 2014/0359198 A1* | 12/2014 | Zaltsman ............... G06F 3/0605 711/103 |
| 2014/0365719 A1 | 12/2014 | Kuzmin et al. |
| 2014/0379968 A1 | 12/2014 | Yao et al. |
| 2015/0169442 A1 | 6/2015 | Fisher et al. |
| 2016/0092121 A1* | 3/2016 | Nazari ................... G06F 3/0616 711/103 |
| 2017/0075591 A1* | 3/2017 | Espeseth ............... G06F 3/0613 |

OTHER PUBLICATIONS

International Search Report and Written Opinion dated Oct. 27, 2014 received in International Patent Application No. PCT/US2014/053868, which corresponds to U.S. Appl. No. 14/470,580, 8 pages (Kruger).

International Search Report and Written Opinion dated Oct. 29, 2014 received in International Patent Application No. PCT/US2014/053879, which corresponds to U.S. Appl. No. 14/470,596, 8 pages (Kruger).

International Search Report and Written Opinion dated Jul. 23, 2015, received in International Patent Application No. PCT/US2015/030847, which corresponds to U.S. Appl. No. 14/321,701, 13 pages (Thuong).

International Search Report and Written Opinion dated Jul. 23, 2015, received in International Patent Application No. PCT/US2015/030851 which corresponds to U.S. Appl. No. 14/298,841, 15 pages (Higgins).

International Search Report and Written Opinion dated Nov. 6, 2015, received in International Patent Application No. PCT/US2015/047892 which corresponds to U.S. Appl. No. 14/621,237, 9 pages (Samuels).

International Search Report and Written Opinion dated Nov. 6, 2015, received in International Patent Application No. PCT/US2015/047897 which corresponds to U.S. Appl. No. 14/621,253, 9 pages (Samuels).

International Search Report and Written Opinion dated Oct. 8, 2015, received in International Patent Application No. PCT/US2015/047898 which corresponds to U.S. Appl. No. 14/621,263, 9 pages (Samuels).

International Search Report and Written Opinion dated Nov. 6, 2014 received in International Patent Application No. PCT/US2014/053941, which corresponds to U.S. Appl. No. 14/621,275, 8 pages (Samuels).

International Search Report and Written Opinion dated Nov. 6, 2015 received in International Patent Application No. PCT/US2015/047901, which corresponds to U.S. Appl. No. 14/621,212, 9 pages (Samuels).

International Search Report and Written Opinion dated Oct. 29, 2015 received in International Patent Application No. PCT/US2015/047904, which corresponds to U.S. Appl. No. 14/621,121, 9 pages (Samuels).

International Search Report and Written Opinion dated Nov. 6, 2015 received in International Patent Application No. PCT/US2014/047908, which corresponds to U.S. Appl. No. 14/621,148, 9 pages (Samuels).

International Preliminary Report on Patentability dated Dec. 6, 2016, received in International Patent Application No. PCT/US2015/030847, which corresponds to U.S. Appl. No. 14/321,701, 9 pages (Truong).

International Preliminary Report on Patentability dated Dec. 6, 2016, received in International Patent Application No. PCT/US2015/030851, which corresponds to U.S. Appl. No. 14/298,841, 10 pages (Higgins).

International Search Report and Written Opinion dated Jan. 12, 2017, received in International Patent Application No. PCT/US2016/051715, which corresponds to U.S. Appl. No. 15/157,367, 13 pages (Thangaraj).

* cited by examiner

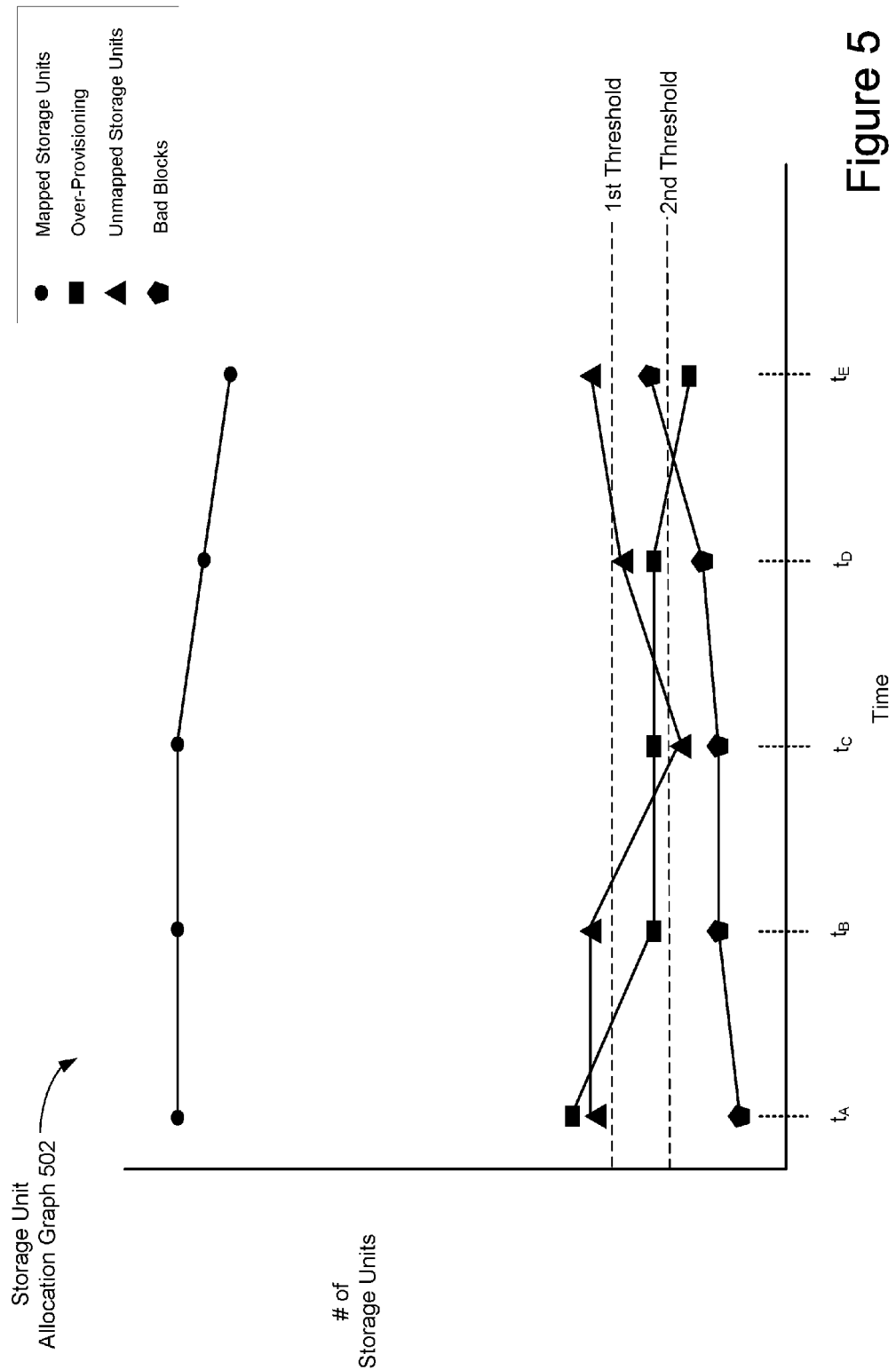

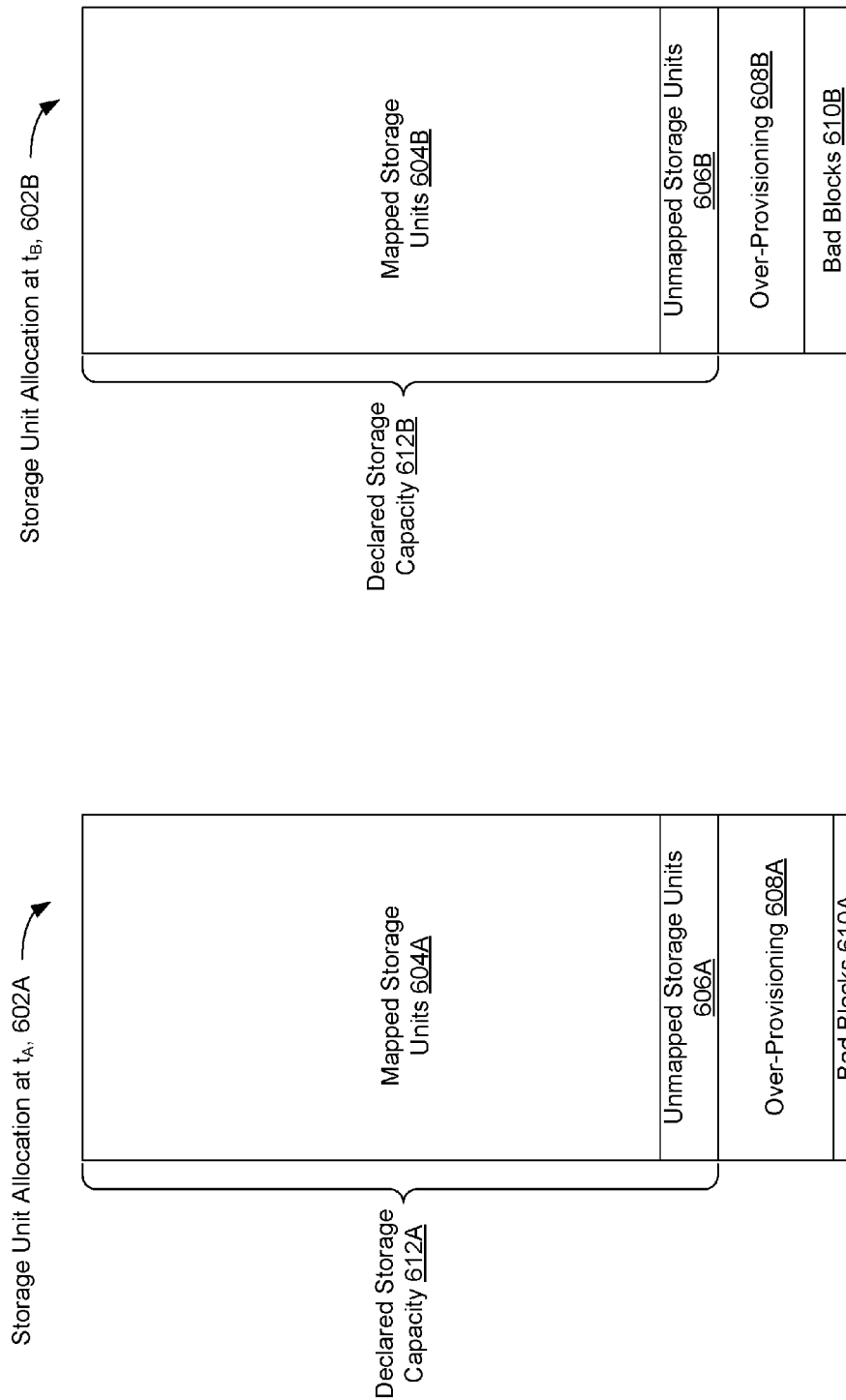

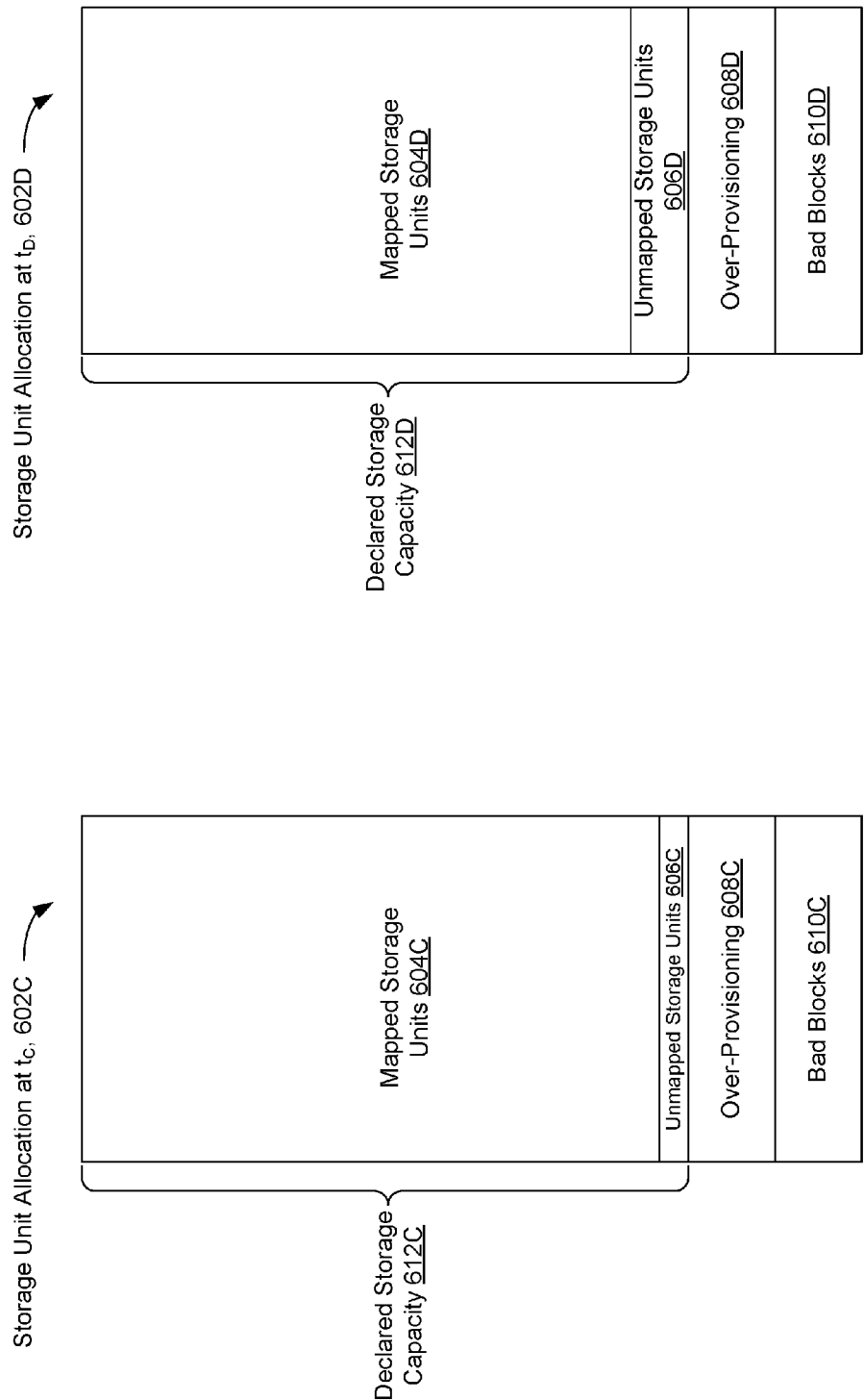

EFFICIENTLY MANAGING UNMAPPED BLOCKS TO EXTEND LIFE OF SOLID STATE DRIVE

RELATED APPLICATIONS

This application claims priority to U.S. Provisional Patent Application No. 62/262,765, entitled "Efficiently Managing Unmapped Blocks to Extend Life of Solid State Drive," filed Dec. 3, 2015, which is hereby incorporated by reference in its entirety.

This application is related to U.S. patent application Ser. No. 14/668,690 filed Mar. 25, 2015, entitled "Processing of Unmap Commands to Enhance Performance and Endurance of a Storage Device" and is also related to U.S. patent application Ser. No. 14/659,493 filed Mar. 16, 2015, entitled "Tracking Intermix of Writes and Unmap Commands across Power Cycles," each of which is hereby incorporated by reference in its entirety.

TECHNICAL FIELD

The disclosed embodiments relate generally to memory systems, and in particular, to efficiently managing unmapped blocks in a storage device (e.g., a solid-state storage device comprising one or more flash memory devices) to extend life of the storage device.

BACKGROUND

To help address unique data storage requirements of solid-state drives (e.g., storage devices that include one or more non-volatile memory devices, such as flash memory devices), flash memory devices typically include over-provisioned space that is used to help manage background memory operations (e.g., garbage collection) without impacting operation and endurance of a solid-state drive. As the number of unusable memory units (i.e., memory units that have failed or can no longer reliably store data, sometimes herein called "bad blocks") increases over the life of the drive, leaving the drive without sufficient space to manage background memory operations, the solid-state device nears the end of its useful life. Therefore, there is a need for flash memory devices that are capable of extending their useful lives, even when over-provisioning is reduced to a level at which there is not sufficient space to manage background memory operations.

SUMMARY

Various embodiments of systems, methods, and devices within the scope of the appended claims each have several aspects, no single one of which is solely responsible for the attributes described herein. Without limiting the scope of the appended claims, after considering this disclosure, and particularly after considering the section entitled "Detailed Description" one will understand how the aspects of various embodiments are used to enable solid-state drives to extend their useful lives by efficiently managing unmapped blocks (even when the solid-state drives have low over-provisioning levels).

In one aspect, a storage device is operated in a first mode of operation (e.g., a default mode of operation) while a level of over-provisioning in the storage device satisfies a first threshold and, in accordance with a determination that the level of over-provisioning does not satisfy the first threshold (i.e., the level of over-provisioning is too low), the storage device is operated in a second mode of operation. While in the second mode of operation, the storage device monitors predicted changes to an unmapped portion of a declared storage capacity of the storage device resulting from processing write commands from a host system and determines whether to accept and process each write command based on the respective predicted change to the unmapped portion of the declared storage capacity (e.g., if the unmapped portion would become too small after processing a host write command, then the storage devices forgoes accepting the host write command). In this way, the unmapped portion is maintained at a sufficient size that allows background processes (e.g., garbage collection) to execute using at least part of the unmapped portion, since over-provisioning levels are too low to provide sufficient space to handle background processes required to keep the storage device in an operational state.

In another aspect, instead of explicitly measuring over-provisioning levels, a storage device keeps track of a quantity of unmapped storage units in the storage device and changes its mode of operation based on changes to the quantity of unmapped storage units. For example, a storage device is operated in a first mode of operation (e.g., a default mode of operation) while a quantity of unmapped storage units in the storage device satisfies a first threshold and, in accordance with a determination that the quantity of unmapped storage units does not satisfy the first threshold, the storage device is operated in a second mode of operation. While in the second mode of operation, the storage device monitors predicted changes to the quantity of unmapped storage units resulting from processing write commands from a host system and determines whether to accept and process each write command based on the respective predicted change to the quantity of unmapped storage units.

BRIEF DESCRIPTION OF THE DRAWINGS

So that the present disclosure can be understood in greater detail, a more particular description may be had by reference to the features of various embodiments, some of which are illustrated in the appended drawings. The appended drawings, however, merely illustrate pertinent features of the present disclosure and are therefore not to be considered limiting, for the description may admit to other effective features.

FIG. 5 is a simplified, prophetic diagram showing allocation of storage units (i.e., numbers of mapped storage units, unmapped storage units, bad storage units, and over-provisioned storage units) in a storage device over time, in accordance with some embodiments.

FIGS. 6A-6E are block diagrams showing allocation of storage units in a storage device at various times that correspond to the times shown in the prophetic diagram of FIG. 5, in accordance with some embodiments.

Figure 1:
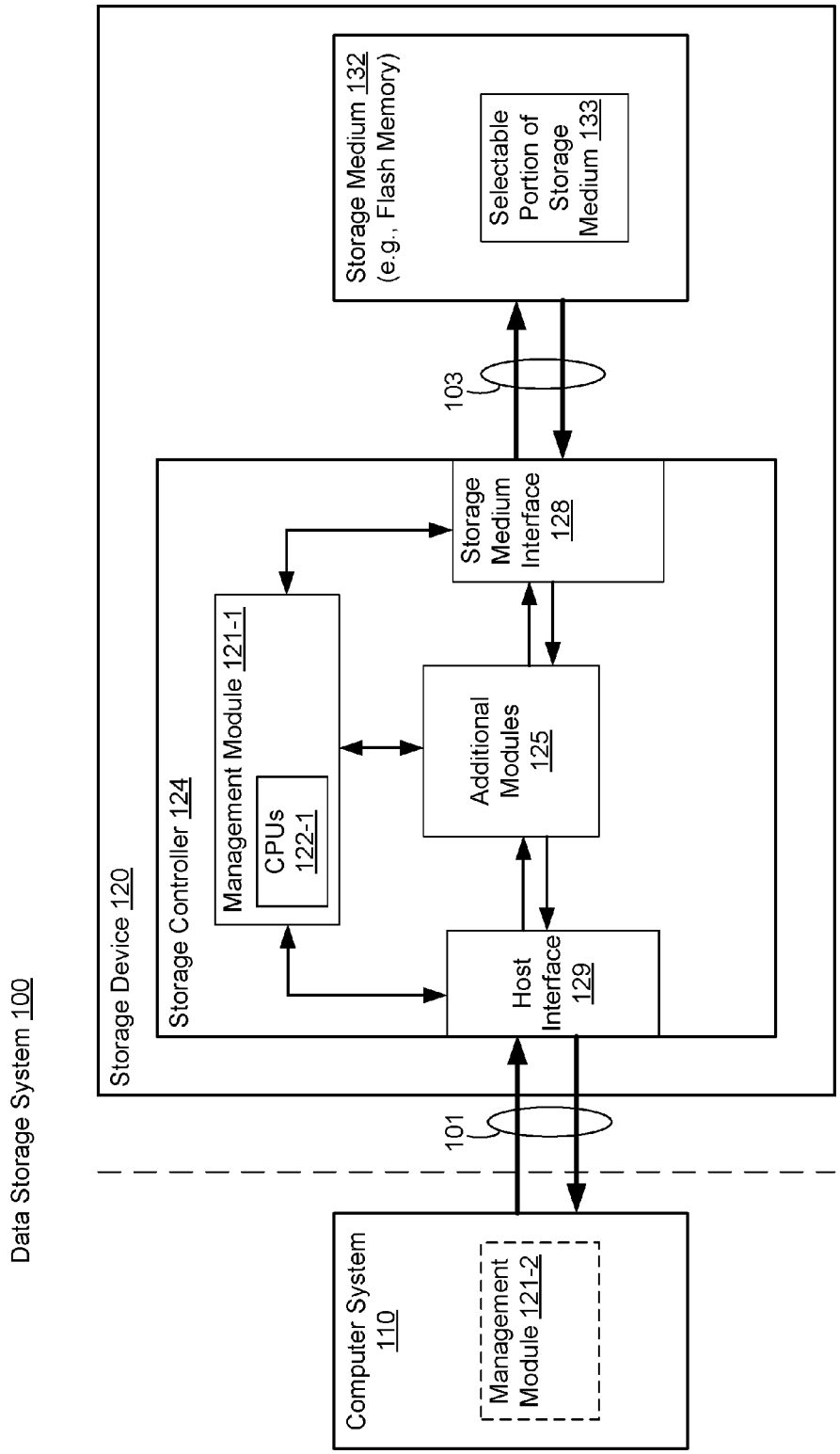
FIG. 1 is a block diagram illustrating an implementation of a data storage system, in accordance with some embodiments.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

A conventional solid-state drive reaches end-of-life when over-provisioning levels are too low to allow the solid-state drive to process write commands (i.e., insufficient over-provisioning space is available to allow the solid-state drive to accept and process the write command and to perform required background processes that are associated with or necessary due to the processing of the write command). In some circumstances, when reaching end-of-life, conventional solid-state drives may still have a particular set of unmapped storage units available (i.e., storage units that are part of a declared storage capacity of the storage device, are still usable for storing data, and have been unmapped by a host system). Consequently, what is desired are mechanisms for efficiently managing unmapped storage units within a storage device (e.g., a solid-state drive with persistent or non-volatile storage units, such as a flash memory device), in order to delay end-of-life conditions for the storage device and allow the storage device to continue processing host write commands while still protecting integrity of data stored on the storage device.

Therefore, to extend the life of a solid-state drive (and thereby extend the solid-state drive's ability to process write commands even when the solid-state drive has a low level of over-provisioning), embodiments disclosed herein have a mode of operation in which unmapped storage units within the solid-state drive are utilized to provide space in which to process background memory operations (e.g., operations such as garbage collection) even though the level of over-provisioning has fallen below a critical or predefined level.

Specifically, the various embodiments described herein include systems, methods, and/or devices used to efficiently manage unmapped blocks to extend life of a solid-state drive with low over-provisioning. In one aspect, a storage device is operated in a first mode of operation (e.g., a default mode of operation) while a level of over-provisioning in the storage device satisfies a first threshold and, in accordance with a determination that the level of over-provisioning does not satisfy the first threshold (i.e., the level of over-provisioning is too low), the storage device is operated in the second mode of operation. While in the second mode of operation, the storage device monitors predicted changes to an unmapped portion of a declared storage capacity of the storage device resulting from processing write commands from a host system and determines whether to accept and process each write command based on the respective predicted change to the unmapped portion of the declared storage capacity (e.g., if the unmapped portion would become too small after processing a host write command, then the storage devices forgoes accepting the host write command). In this way, the unmapped portion is maintained at a sufficient size that allows background processes (e.g., garbage collection) to execute using the unmapped portion, since over-provisioning levels are too low to provide sufficient space to handle all of the background processes.

(A1) More specifically, some embodiments include a method of managing a storage device that includes non-volatile memory. In some embodiments, the method includes: measuring a level of over-provisioning in the storage device and operating the storage device in a mode of operation that is a first mode of operation (e.g., default/normal mode of operation) while the level of over-provisioning in the storage device satisfies a first threshold. The method further includes: changing the mode of operation of the storage device to a second mode of operation in accordance with a determination that the level of over-provisioning in the storage device does not satisfy (e.g., is less than) the first threshold. While operating the storage device in the second mode of operation, the method includes: (i) determining a portion of a declared storage capacity of the storage device that is unmapped; (ii) receiving a write command from a host system; and (iii) determining whether processing the write command would reduce the portion of the declared storage capacity of the storage device that is unmapped to less than a second threshold (i.e., the decision to process write commands while in the second mode of operation is based on the number of unmapped blocks that would remain after processing a respective write command). In accordance with a determination that processing the write command would not reduce the portion of the declared storage capacity of the storage device that is unmapped to less than the second threshold, the method includes: accepting and processing the write command from the host system. In accordance with a determination that processing the write command would reduce the portion of the declared storage capacity of the storage device that is unmapped to less than the second threshold, the method includes: forgoing acceptance and processing of the write command from the host system.

(A2) In some embodiments of the method of A1, the method further includes: sending a status message to the host system in accordance with the determination that the level of over-provisioning in the storage device does not satisfy the first threshold.

(A3) In some embodiments of the method of any of A1-A2, the method further includes: sending a status message to the host system in accordance with the determination that processing the write command would reduce the portion of the declared storage capacity of the storage device that is unmapped to less than the second threshold.

(A4) In some embodiments of the method of A3, the status message to the host system comprises a request that the host system unmap a portion of the storage device's storage capacity.

(A5) In some embodiments of the method of any of A1-A4, forgoing acceptance and processing of the write command from the host system includes changing the mode of operation of the storage device to a third mode of operation (a mode of operation that is distinct from both the first and second modes of operation) in which the storage device does not accept and process write commands from the host system.

(A6) In some embodiments of the method of A5, the method further includes: while operating the storage device in the third mode of operation, receiving one or more unmap commands from the host system. In accordance with a determination that, as result of processing the received one or more unmap commands, the portion of the declared storage capacity of the storage device that is unmapped would satisfy the second threshold, the method includes: changing the mode of operation of the storage device to the second mode of operation. In other words, by having the host system unmap storage units, the portion of the declared capacity of the storage device that is unmapped is increased and the storage device is able to return to an operational state (i.e., a mode of operation in which the storage device is able to accept and process write commands from the host system).

(A7) In some embodiments of the method of any of A1-A6, determining the portion of the declared storage capacity of the storage device that is unmapped comprises determining a quantity of storage units in the declared storage capacity of the storage device that are usable for storing data and unmapped.

(A8) In some embodiments of the method of any of A1-A7, measuring the level of over-provisioning in the storage device comprises determining a first quantity of storage units in the storage device, comprising storage units that are mapped for storing data and storage units that are usable for storing data and unmapped, and subtracting from the first quantity a quantity corresponding to the declared storage capacity of the storage device.

(A9) In another aspect, a storage device includes non-volatile memory (e.g., one or more non-volatile storage devices, such as flash memory devices), one or more processors, and a storage controller that includes one or more controller modules. The one or more controller modules are configured to: measure a level of over-provisioning in the storage device and operate the storage device in a mode of operation that is a first mode of operation (e.g., default/normal mode of operation) while the level of over-provisioning in the storage device satisfies a first threshold. The one or more controller modules are further configured to: change the mode of operation of the storage device to a second mode of operation in accordance with a determination that the level of over-provisioning in the storage device does not satisfy the first threshold. While operating the storage device in the second mode of operation, the one or more controller modules are configured to: (i) determine a portion of a declared storage capacity of the storage device that is unmapped; (ii) receive a write command from a host system; and (iii) determine whether processing the write command would reduce the portion of the declared storage capacity of the storage device that is unmapped to less than a second threshold (i.e., the decision to process write commands while in the second mode of operation is based on number of unmapped blocks that would remain after processing a respective write command). In accordance with a determination that processing the write command would not reduce the portion of the declared storage capacity of the storage device that is unmapped to less than the second threshold, the one or more controller modules are configured to: accept and process the write command from the host system. In accordance with a determination that processing the write command would reduce the portion of the declared storage capacity of the storage device that is unmapped to less than the second threshold, the one or more controller modules are configured to: forgo acceptance and processing of the write command from the host system.

(A10) In some embodiments of the storage device of A9, the one or more controller modules include: an over-provisioning measurement module for measuring the level of over-provisioning in the storage device. The one or more controller modules further include: a mode of operation module for (i) operating the storage device in the mode of operation that is the first mode of operation while the level of over-provisioning in the storage device satisfies a first threshold and (ii) changing the mode of operation to a second mode of operation in accordance with a determination that the level of over-provisioning in the storage device does not satisfy the first threshold. The one or more controller modules also include: an unmap module for determining the portion of the declared storage capacity that is unmapped. The one or more controller modules additionally include: a data write module for: (i) receiving the write command from the host system; (ii) determining whether processing the write command would reduce the portion of the declared storage capacity that is unmapped to less than the second threshold; (iii) accepting and processing the write command from the host system in accordance with the determination that processing the write command would not reduce the portion of the declared storage capacity of the storage device that is unmapped to less than the second threshold; and (iv) forgoing acceptance and processing of the write command from the host system in accordance with the determination that processing the write command would reduce the portion of the declared storage capacity of the storage device that is unmapped to less than the second threshold.

(A11) In some embodiments of the storage device of any of A9-A10, the one or more controller modules include a host messaging module for sending a status message to the host system in accordance with the determination that the level of over-provisioning in the storage device does not satisfy the first threshold.

(A12) In some embodiments of the storage device of any of A9-A11, the one or more controller modules include a host messaging module for sending a status message to the host system in accordance with the determination that processing the write command would reduce the portion of the declared storage capacity of the storage device that is unmapped to less than the second threshold.

(A13) In some embodiments of the storage device of A12, the status message to the host system comprises a request that the host system unmap a portion of the storage device's storage capacity.

(A14) In some embodiments of the storage device of any of A9-A13, forgoing acceptance and processing of the write command from the host system includes changing the mode of operation of the storage device to a third mode of operation in which the storage device does not accept and process write commands from the host system.

(A15) In some embodiments of the storage device of A14, the one or more controller modules are further configured to: while operating the storage device in the third mode of operation, receive one or more unmap commands from the host system. In accordance with a determination that, as result of processing the received one or more unmap commands, the portion of the declared storage capacity of the storage device that is unmapped would satisfy the second threshold, the one or more controller modules are configured to: change the mode of operation of the storage device to the second mode of operation.

(A16) In some embodiments of the storage device of any of A9-A15, determining the portion of the declared storage capacity of the storage device that is unmapped comprises determining a quantity of storage units in the declared storage capacity of the storage device that are usable for storing data and unmapped.

(A17) In some embodiments of the storage device of any of A9-A16, measuring the level of over-provisioning in the storage device comprises determining a first quantity of storage units in the storage device, comprising storage units that are mapped for storing data and storage units that are usable for storing data and unmapped, and subtracting from the first quantity a quantity corresponding to the declared storage capacity of the storage device.

(A18) In yet another aspect, a storage device includes non-volatile memory, one or more processors, and means for performing the method of any of A1 to A8 described above.

(A19) In yet another aspect, a non-transitory computer-readable storage medium stores one or more programs configured for execution by one or more processors of a storage device, the one or more programs including instructions for causing the storage device to perform the method of any of A1 to A8 described above.

In another aspect, an explicit measurement of a level of over-provisioning is not used and, instead, the storage device monitors a quantity of unmapped storage units in the storage device to determine when to switch to life-extending modes of operation. For example, a storage device is operated in a first mode of operation (e.g., a default mode of operation) while a quantity of unmapped storage units in the storage device satisfies a first threshold and, in accordance with a determination that the quantity of unmapped storage units does not satisfy the first threshold, the storage device is operated in a second mode of operation. While in the second mode of operation, the storage device monitors predicted changes to the quantity of unmapped storage units resulting from processing write commands from a host system and determines whether to accept and process each write command based on the respective predicted change to the quantity of unmapped storage units. In this way, the unmapped portion is maintained at a sufficient size so that background processes (e.g., garbage collection) can continue to execute using the unmapped portion (in the event that over-provisioning levels are too low to execute required background processes), thereby extending useful life of the storage device.

(B1) More specifically, some embodiments include a method of managing a storage device that includes non-volatile memory. In some embodiments, the method includes: determining a quantity of storage units in the storage device that are unmapped and operating the storage device in a mode of operation that is a first mode of operation (e.g., default/normal mode of operation) while the quantity of storage units in the storage device that are unmapped satisfies (e.g., is greater than or equal to) a first threshold. The method further includes: changing the mode of operation of the storage device to a second mode of operation in accordance with a determination that the quantity of storage units in the storage device that are unmapped does not satisfy (e.g., is less than) the first threshold. While operating the storage device in the second mode of operation, the method includes: (i) receiving a write command from a host system and (ii) determining whether processing the write command would reduce the quantity of storage units in the storage device that are unmapped to a quantity less than a second threshold. In accordance with a determination that processing the write command would not reduce the quantity of storage units in the storage device that are unmapped to a quantity less than the second threshold, the method includes: accepting and processing the write command from the host system. In accordance with a determination that processing the write command would reduce the quantity of storage units in the storage device that are unmapped to a quantity less than the second threshold, the method includes: forgoing acceptance and processing of the write command from the host system.

(B2) In some embodiments of the method of B1, the method further includes: sending a status message to a host system in accordance with the determination that the quantity of storage units in the storage device that are unmapped does not satisfy the first threshold.

(B3) In some embodiments of the method of B1, the method further includes: sending a status message to a host system in accordance with the determination that processing the write command would reduce the quantity of storage units in the storage device that are unmapped to a quantity less than the second threshold.

(B4) In some embodiments of the method of B3, the status message to the host system comprises a request that the host system unmap a portion of the storage device's storage capacity (e.g., a portion of a declared storage capacity of the storage device).

(B5) In some embodiments of the method of any of B1-B4, forgoing acceptance and processing of the write command from the host system includes changing the mode of operation of the storage device to a third mode of operation (distinct from the first and the second modes of operation) in which the storage device does not accept and process write commands from the host system.

(B6) In some embodiments of the method of B5, the method further includes: while operating the storage device in the third mode of operation, receiving one or more unmap commands from the host system. In accordance with a determination that, as result of processing the received one or more unmap commands, the quantity of storage units in the storage device that are unmapped would satisfy the second threshold, the method includes: changing the mode of operation of the storage device to the second mode of operation.

(B7) In some embodiments of the method of any of B1-B6, the method further includes: while operating the storage device in the second mode of operation, receiving one or more unmap commands (e.g., received from a host system). In accordance with a determination that, as a result of processing the received one or more unmap commands, the quantity of storage units in the storage device that are unmapped would satisfy the first threshold, the method includes: changing the mode of operation of the storage device to the first mode of operation.

(B8) In some embodiments of the method of any of B1-B7, determining the quantity of storage units in the storage device that are unmapped includes determining a quantity of storage units in the storage device that are usable for storing data and unmapped.

(B9) In another aspect, a storage device includes non-volatile memory (e.g., one or more non-volatile storage devices, such as flash memory devices), one or more processors, and a storage controller that includes one or more controller modules. The one or more controller modules are configured to: (i) determine a quantity of storage units in the storage device that are unmapped and (ii) operate the storage device in a mode of operation that is a first mode of operation while the quantity of storage units in the storage device that are unmapped satisfies (e.g., is greater than or equal to) a first threshold. The one or more controller modules are further configured to: change the mode of operation of the storage device to a second mode of operation in accordance with a determination that the quantity of storage units in the storage device that are unmapped does not satisfy (e.g., is less than) the first threshold. While operating the storage device in the second mode of operation: (i) receive a write command from a host system and (ii) determine whether processing the write command would reduce the quantity of storage units in the storage device that are unmapped to a quantity less than a second threshold. In accordance with a determination that processing the write command would not reduce the quantity of storage units in the storage device that are unmapped to a quantity less than a second threshold, the one or more controller modules are configured to: accept and process the write command from the host system. In accordance with a determination that processing the write command would reduce the quantity of storage units in the storage device that are unmapped to a quantity less than a second threshold, the one or more controller modules are configured to: forgo acceptance and processing of the write command from the host system.

(B10) In some embodiments of the storage device of B9, the one or more controller modules include: an unmap module for determining the quantity of storage units in the storage device that are unmapped. The one or more controller modules also include: a mode of operation module for (i) operating the storage device in a mode of operation that is a first mode of operation while the quantity of storage units in the storage device that are unmapped satisfies a first threshold and (ii) changing the mode of operation to a second mode of operation in accordance with a determination that the quantity of storage units in the storage device that are unmapped does not satisfy the first threshold. The one or more controller modules further include: a data write module for: (i) receiving the write command from the host system; (ii) determining whether processing the write command would reduce the quantity of storage units in the storage device that are unmapped to a quantity less than a second threshold; (iii) accepting and processing the write command from the host system in accordance with the determination that processing the write command would not reduce the quantity of storage units in the storage device that are unmapped to a quantity less than the second threshold; and (iv) forgoing acceptance and processing of the write command from the host system in accordance with the determination that processing the write command would reduce the quantity of storage units in the storage device that are unmapped to a quantity less than the second threshold.

(B11) In some embodiments of the storage device of any of B9-B10, the one or more controller modules include a host messaging module for sending a status message to the host system in accordance with the determination that the quantity of storage units in the storage device that are unmapped does not satisfy the first threshold.

(B12) In some embodiments of the storage device of any of B9-B11, the one or more controller modules include a host messaging module for sending a status message to the host system in accordance with the determination that processing the write command would reduce the quantity of storage units in the storage device that are unmapped to a quantity less than the second threshold.

(B13) In some embodiments of the storage device of B12, the status message to the host system comprises a request that the host system unmap a portion of the storage device's storage capacity.

(B14) In some embodiments of the storage device of any of B9-B13, forgoing acceptance and processing of the write command from the host system includes changing the mode of operation of the storage device to a third mode of operation in which the storage device does not accept and process write commands from the host system.

(B15) In some embodiments of the storage device of any of B14, the one or more controller modules are further configured to: while operating the storage device in the third mode of operation, receive one or more unmap commands from the host system. In accordance with a determination that, as result of processing the received one or more unmap commands, the quantity of storage units in the storage device that are unmapped would satisfy the second threshold, the one or more controller modules are configured to: change the mode of operation of the storage device to the second mode of operation.

(B16) In some embodiments of the storage device of any of B9-B15, the one or more controller modules are further configured to: while operating the storage device in the second mode of operation, receive one or more unmap commands. In accordance with a determination that, as a result of processing the received one or more unmap commands, the quantity of storage units in the storage device that are unmapped would satisfy the first threshold, the one or more controller modules are configured to: change the mode of operation of the storage device to the first mode of operation.

(B17) In some embodiments of the storage device of any of B9-B16, determining the portion of the declared storage capacity of the storage device that is unmapped comprises determining a quantity of storage units in the storage device that are usable for storing data and unmapped.

(B18) In yet another aspect, a storage device includes non-volatile memory, one or more processors, and means for performing the method of any of B1 to B8 described above.

(B19) In yet another aspect, a non-transitory computer-readable storage medium stores one or more programs configured for execution by one or more processors of a storage device, the one or more programs including instructions for causing the storage device to perform the method of any of B1 to B8 described above.

Numerous details are described herein in order to provide a thorough understanding of the example embodiments illustrated in the accompanying drawings. However, some embodiments may be practiced without many of the specific details, and the scope of the claims is only limited by those features and aspects specifically recited in the claims. Furthermore, well-known methods, components, and circuits have not been described in exhaustive detail so as not to unnecessarily obscure pertinent aspects of the embodiments described herein.

FIG. 1 is a block diagram illustrating an implementation of a data storage system 100, in accordance with some embodiments. While some example features are illustrated, various other features have not been illustrated for the sake of brevity and so as not to obscure pertinent aspects of the example embodiments disclosed herein. To that end, as a non-limiting example, data storage system 100 includes a storage device 120 (also sometimes called an information storage device, or a data storage device, or a memory device), which includes a storage controller 124 and a storage medium 132, and is used in conjunction with or includes a computer system 110 (e.g., a host system or a host computer). In some embodiments, storage medium 132 is a single flash memory device while in other embodiments storage medium 132 includes a plurality of flash memory devices. In some embodiments, storage medium 132 is NAND-type flash memory or NOR-type flash memory. In some embodiments, storage medium 132 includes one or more three-dimensional (3D) memory devices. Further, in some embodiments, storage controller 124 is a solid-state drive (SSD) controller. However, other types of storage media may be included in accordance with aspects of a wide variety of embodiments (e.g., PCRAM, ReRAM, STT-RAM, etc.). In some embodiments, a flash memory device includes one or more flash memory die, one or more flash memory packages, one or more flash memory channels or the like. In some embodiments, data storage system 100 can contain one or more storage devices 120.

Computer system 110 is coupled to storage controller 124 through data connections 101. However, in some embodiments computer system 110 includes storage controller 124, or a portion of storage controller 124, as a component and/or as a subsystem. For example, in some embodiments, some or all of the functionality of storage controller 124 is implemented by software executed on computer system 110. Computer system 110 may be any suitable computer device, such as a computer, a laptop computer, a tablet device, a netbook, an internet kiosk, a personal digital assistant, a mobile phone, a smart phone, a gaming device, a computer server, or any other computing device. Computer system 110 is sometimes called a host, host system, client, or client system. In some embodiments, computer system 110 is a server system, such as a server system in a data center. In some embodiments, computer system 110 includes one or more processors, one or more types of memory, a display and/or other user interface components such as a keyboard, a touch-screen display, a mouse, a track-pad, a digital camera, and/or any number of supplemental I/O devices to add functionality to computer system 110. In some embodiments, computer system 110 does not have a display and other user interface components.

Storage medium 132 is coupled to storage controller 124 through connections 103. Connections 103 are sometimes called data connections, but typically convey commands in addition to data, and optionally convey metadata, error correction information and/or other information in addition to data values to be stored in storage medium 132 and data values read from storage medium 132. In some embodiments, however, storage controller 124 and storage medium 132 are included in the same device (i.e., an integrated device) as components thereof. Furthermore, in some embodiments, storage controller 124 and storage medium 132 are embedded in a host device (e.g., computer system 110), such as a mobile device, tablet, other computer or computer controlled device, and the methods described herein are performed, at least in part, by the embedded storage controller. Storage medium 132 may include any number (i.e., one or more) of memory devices including, without limitation, non-volatile semiconductor memory devices, such as flash memory device(s). For example, flash memory device(s) can be configured for enterprise storage suitable for applications such as cloud computing, for database applications, primary and/or secondary storage, or for caching data stored (or to be stored) in secondary storage, such as hard disk drives. Additionally and/or alternatively, flash memory device(s) can also be configured for relatively smaller-scale applications such as personal flash drives or hard-disk replacements for personal, laptop, and tablet computers.

Storage medium 132 is divided into a number of addressable and individually selectable blocks, such as selectable portion 133. In some embodiments, the individually selectable blocks are the minimum size erasable units in a flash memory device. In other words, each block contains the minimum number of memory cells that can be erased without erasing any other memory cells in the same flash memory device. Typically, when a flash memory block is erased, all memory cells in the block are erased simultaneously. Each block is usually further divided into a plurality of pages and/or word lines, where each page or word line is typically an instance of the smallest individually accessible (readable) portion in a block. In some embodiments (e.g., using some types of flash memory), the smallest individually accessible unit of a data set, however, is a sector, which is a subunit of a page. That is, a block includes a plurality of pages, each page contains a plurality of sectors, and each sector is the minimum unit of data for reading data from the flash memory device. For example, in some implementations, each block includes a number of pages, such as 64 pages, 128 pages, 256 pages or another suitable number of pages. In some embodiments (e.g., in some flash memory die), blocks are grouped into a plurality of zones. Each block zone can be independently managed to some extent, which increases the degree of parallelism for parallel operations and simplifies management of storage medium 132.

In some embodiments, reading and programming (also called writing) of the storage medium is performed on a smaller subunit of a block (e.g., on a page basis, word line basis, or sector basis). The smaller subunit of a block typically consists of multiple memory cells (e.g., single-level cells or multi-level cells). In some embodiments, programming is performed on an entire page (i.e., all memory cells of the page are programmed (i.e., written) concurrently). In some embodiments, a multi-level cell (MLC) NAND flash has four possible states per cell, yielding two bits of information per cell. Further, in some embodiments, an MLC NAND has two page types: (1) a lower page (sometimes called fast page), and (2) an upper page (sometimes called slow page). In some embodiments, a triple-level cell (TLC) NAND flash has eight possible states per cell, yielding three bits of information per cell. Although the description herein uses TLC, MLC, and SLC as examples, those skilled in the art will appreciate that the embodiments described herein may be extended to memory cells that have more than eight possible states per cell, yielding more than three bits of information per cell. In some embodiments, the encoding format of the storage media (i.e., TLC, MLC, or SLC and/or a chosen data redundancy mechanism) is a choice made when data is actually written to the storage media.

In some embodiments and as noted above, data is written to a storage medium in pages, but is erased from the storage medium in blocks. As such, pages in the storage medium may contain invalid (e.g., stale) data, but those pages cannot be overwritten until the whole block containing those pages is erased. In order to write to the pages with invalid data, the pages (if any) with valid data in that block are read and re-written to a new block and the old block is erased (or put on a queue for erasing). This process is called garbage collection. After garbage collection, the new block contains the pages with valid data and may have free pages that are available for new data to be written, and the old block can be erased so as to be available for new data to be written. Since flash memory can only be programmed and erased a limited number of times, the efficiency of the algorithm used to pick the next block(s) to re-write and erase has a significant impact on the lifetime and reliability of flash-based storage systems.

In some embodiments, garbage collection is performed using over-provisioned space on the storage device. In some embodiments, over-provisioning refers to the difference between the physical capacity of the storage device (e.g., the physical capacity less capacity set aside for management data structures and metadata) for storing user data (e.g., data stored in the storage system on behalf of a host or host system), and the logical capacity (e.g., a declared storage capacity) presented as available for use by a host or user. For example, in some embodiments, if a non-volatile memory of a storage device has 12 GB of total storage capacity (e.g., total storage capacity for storing user data) and 10 GB of declared capacity, then the non-volatile memory of the storage device has 2 GB of over-provisioning. Unlike declared storage capacity, which is the storage capacity available to a host (e.g., as represented by declared storage capacities 612A, 612B, 612C, 612D, and 612E in FIGS. 6A-6E), the extra capacity of over-provisioning is not visible to the host as available storage. Instead, over-provisioning is used to increase endurance of a storage device (e.g., by distributing the total number of writes and erases across a larger population of blocks and/or pages over time), improve performance, and reduce write amplification.

In some embodiments, when a storage device reaches end-of-life due to low levels of over-provisioning, the storage device may still have a certain quantity of unmapped storage units within the declared storage capacity of the storage device that are usable for storing data. In some embodiments, instead of reaching end-of-life operations, the storage device repurposes (or temporarily uses) unmapped storage units that are part of the declared storage capacity of the storage device in order to compensate for a low level of over-provisioning within the storage device. In this way, instead transitioning to an end-of-life mode of operation (sometimes called a read-only mode of operation) when the storage device reaches a predefined low level of over-provisioning, the storage device is able to use the unmapped storage units that are part of the declared storage capacity of the storage device to process background memory operations such as garbage collection (i.e., the unmapped storage units are used to supplement a low level of over-provisioning).

In some embodiments (discussed below in reference to FIGS. 7 and 8A-8C), the storage device switches from a first mode of operation (e.g., a default mode of operation) to second mode of operation (e.g., a mode of operation that allows the storage device to use unmapped storage units that are part of the declared storage capacity as a substitute for over-provisioned capacity) in accordance with a determination that over-provisioning in the storage device is below a first threshold. In some embodiments, the first threshold corresponds to a number of storage units that is approximately 10% of the number of storage units of the declared storage capacity of the storage device. In some embodiments, in accordance with a determination that, as a result of processing a write command, a portion of the declared storage capacity of the storage device that is unmapped would fall below a second threshold, the storage device then switches to a third mode of operation (e.g., a read-only mode of operation in which the storage device does not accept and process host write commands). In some embodiments, the second threshold corresponds to a number of storage units that is approximately 5% of a number of storage units in the declared storage capacity of the storage device. In some embodiments, the second threshold increases as the over-provisioning of the storage device decreases. For example, in some such embodiments, the second threshold corresponds to a number of unmapped storage units of the declared capacity that, when combined with the over-provisioning, is approximately 10% of the number of storage units of the declared storage capacity of the storage device.

In other embodiments (discussed below in reference to FIGS. 9 and 10A-10C) in which the level of over-provisioning is not used as a separate metric, the same first and second thresholds described above may still be utilized, or, alternatively, other values for the first and second thresholds may instead be utilized. Additional details regarding the use of thresholds for determining when to change a mode of operation for a storage device are provided below in reference to FIGS. 5-10C.

Returning to the description of FIG. 1, write amplification is a phenomenon where the actual amount of physical data written to a storage medium (e.g., storage medium 132 of storage device 120) is a multiple of the logical amount of data written by a host (e.g., computer system 110, sometimes called a host) to the storage medium. As discussed above, when a block of storage medium must be erased before it can be re-written, the garbage collection process to perform these operations results in re-writing data one or more times. This multiplying effect increases the number of writes required over the life of a storage medium, which shortens the time it can reliably operate. The formula to calculate the write amplification of a storage system is given by the following equation:

$$\frac{\text{amount of data written to a storage medium}}{\text{amount of data written by a host}}$$

One of the goals of any flash memory based data storage system architecture is to reduce write amplification as much as possible so that available endurance is used to meet storage medium reliability and warranty specifications. Higher system endurance also results in lower cost as the storage system may need less over-provisioning. By reducing write amplification, the endurance of the storage medium is increased and the overall cost of the storage system is decreased.

Continuing with the description of FIG. 1, in some embodiments, storage controller 124 includes a management module 121-1, a host interface 129, a storage medium (I/O) interface 128, and additional module(s) 125. Storage controller 124 may include various additional features that have not been illustrated for the sake of brevity and so as not to obscure pertinent features of the example embodiments disclosed herein, and a different arrangement of features may be possible.

Host interface 129 provides an interface to computer system 110 through data connections 101. Similarly, storage medium interface 128 provides an interface to storage medium 132 though connections 103. In some embodiments, storage medium interface 128 includes read and write circuitry, including circuitry capable of providing reading signals to storage medium 132 (e.g., reading threshold voltages for NAND-type flash memory, as discussed below). In some embodiments, connections 101 and connections 103 are implemented as communication media over which commands and data are communicated, using a protocol such as DDR3, SCSI, SATA, SAS, or the like. In some embodiments, storage controller 124 includes one or more processing units (also sometimes called CPUs, processors, microprocessors, or microcontrollers) configured to execute instructions in one or more programs (e.g., in storage controller 124). In some embodiments, the one or more processors are shared by one or more components within, and in some cases, beyond the function of storage controller 124.

In some embodiments, management module 121-1 includes one or more central processing units (CPUs, also sometimes called processors, hardware processors, microprocessors or microcontrollers) 122 configured to execute instructions in one or more programs (e.g., in management module 121-1). In some embodiments, the one or more CPUs 122 are shared by one or more components within, and in some cases, beyond the function of storage controller 124. Management module 121-1 is coupled to host interface 129, additional module(s) 125, and storage medium interface 128 in order to coordinate the operation of these components. In some embodiments, one or more modules of management module 121-1 are implemented in management module 121-2 of computer system 110. In some embodiments, one or more processors of computer system 110 (not shown) are configured to execute instructions in one or more programs (e.g., in management module 121-2). Management module 121-2 is coupled to storage device 120 in order to manage the operation of storage device 120.

Additional module(s) 125 are coupled to storage medium interface 128, host interface 129, and management module 121-1. As an example, additional module(s) 125 may include an error control module to limit the number of uncorrectable errors inadvertently introduced into data during writes to memory and/or reads from memory. In some embodiments, additional module(s) 125 are executed in software by the one or more CPUs 122 of management module 121-1, and, in other embodiments, additional module(s) 125 are implemented in whole or in part using special purpose circuitry (e.g., to perform encoding and decoding functions). In some embodiments, additional module(s) 125 are implemented in whole or in part by software executed on computer system 110.

As data storage densities of non-volatile semiconductor memory devices continue to increase, stored data is more prone to being stored and/or read erroneously. In some embodiments, error control coding can be utilized to limit the number of uncorrectable errors that are introduced by electrical fluctuations, defects in the storage medium, operating conditions, device history, write-read circuitry, etc., or a combination of these and various other factors.

In some embodiments, an error control module, included in additional module(s) 125, includes an encoder and a decoder. In some embodiments, the encoder encodes data by applying an error control code (ECC) to produce a codeword, which is subsequently stored in storage medium 132. When encoded data (e.g., one or more codewords) is read from storage medium 132, the decoder applies a decoding process to the encoded data to recover the data, and to correct errors in the recovered data within the error correcting capability of the error control code. Those skilled in the art will appreciate that various error control codes have different error detection and correction capacities, and that particular codes are selected for various applications for reasons beyond the scope of this disclosure. As such, an exhaustive review of the various types of error control codes is not provided herein. Moreover, those skilled in the art will appreciate that each type or family of error control codes may have encoding and decoding algorithms that are particular to the type or family of error control codes. On the other hand, some algorithms may be utilized at least to some extent in the decoding of a number of different types or families of error control codes. As such, for the sake of brevity, an exhaustive description of the various types of encoding and decoding algorithms generally available and known to those skilled in the art is not provided herein.

In some embodiments, during a write operation, host interface 129 receives data to be stored in storage medium 132 from computer system 110. The data received by host interface 129 is made available to an encoder (e.g., in additional module(s) 125), which encodes the data to produce one or more codewords. The one or more codewords are made available to storage medium interface 128, which transfers the one or more codewords to storage medium 132 in a manner dependent on the type of storage medium being utilized.

In some embodiments, a read operation is initiated when computer system (host) 110 sends one or more host read commands (e.g., via data connections 101, or alternatively a separate control line or bus) to storage controller 124 requesting data from storage medium 132. Storage controller 124 sends one or more read access commands to storage medium 132, via storage medium interface 128, to obtain raw read data in accordance with memory locations (or logical addresses, object identifiers, or the like) specified by the one or more host read commands. Storage medium interface 128 provides the raw read data (e.g., comprising one or more codewords) to a decoder (e.g., in additional module(s) 125). If the decoding is successful, the decoded data is provided to host interface 129, where the decoded data is made available to computer system 110. In some embodiments, if the decoding is not successful, storage controller 124 may resort to a number of remedial actions or provide an indication of an irresolvable error condition.

Flash memory devices (in some embodiments, storage medium 132) utilize memory cells (e.g., SLC, MLC, and/or TLC) to store data as electrical values, such as electrical charges or voltages. Each flash memory cell typically includes a single transistor with a floating gate that is used to store a charge, which modifies the threshold voltage of the transistor (i.e., the voltage needed to turn the transistor on). The magnitude of the charge, and the corresponding threshold voltage the charge creates, is used to represent one or more data values. In some embodiments, during a read operation, a reading threshold voltage is applied to the control gate of the transistor and the resulting sensed current or voltage is mapped to a data value.

The terms "cell voltage" and "memory cell voltage," in the context of flash memory cells, mean the threshold voltage of the memory cell, which is the minimum voltage that needs to be applied to the gate of the memory cell's transistor in order for the transistor to conduct current. Similarly, reading threshold voltages (sometimes also called reading signals and reading voltages) applied to flash memory cells are gate voltages applied to the gates of the flash memory cells to determine whether the memory cells conduct current at that gate voltage. In some embodiments, when a flash memory cell's transistor conducts current at a given reading threshold voltage, indicating that the cell voltage is less than the reading threshold voltage, the raw data value for that read operation is a "1" and otherwise the raw data value is a "0."

Figure 2:
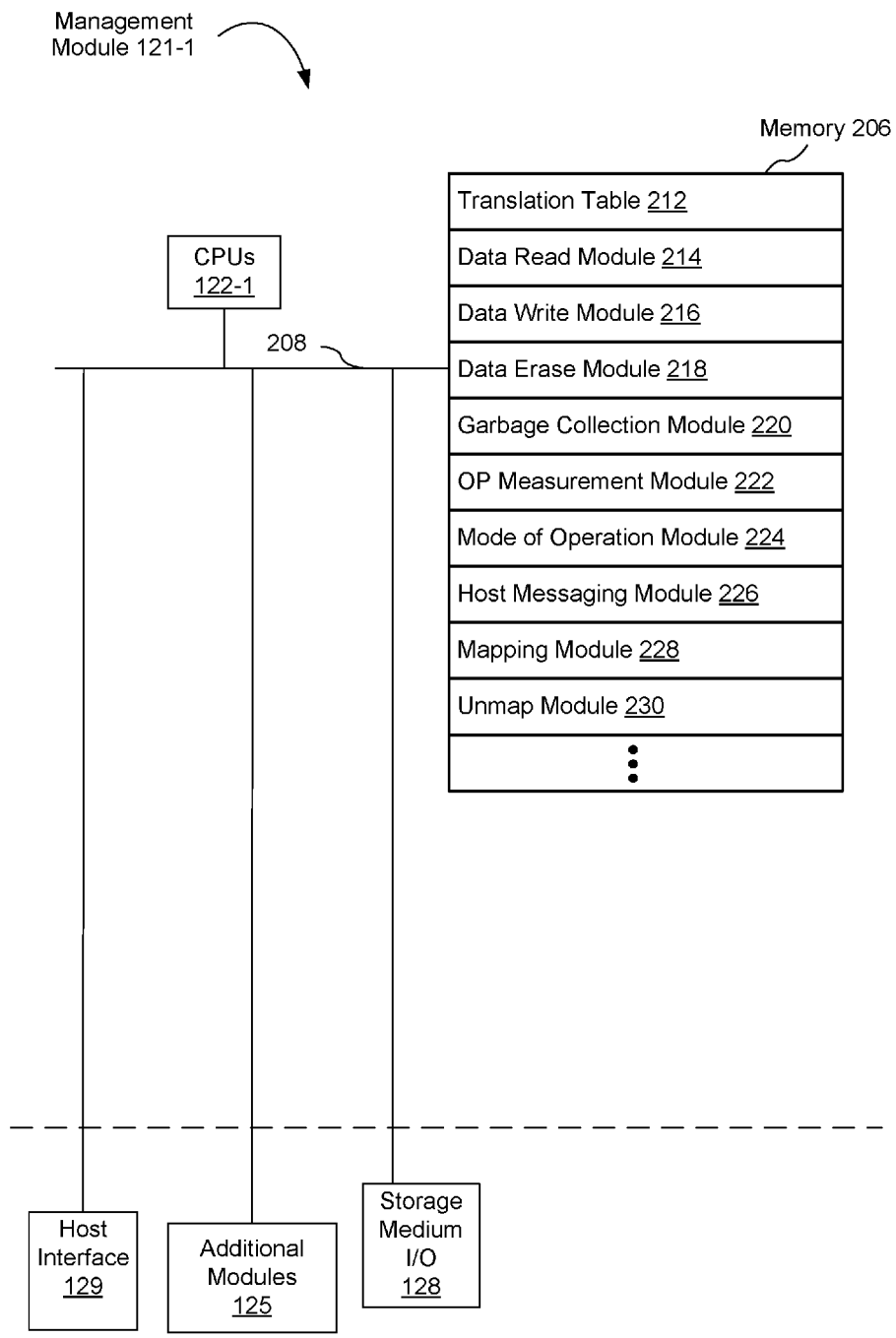
FIG. 2 is a block diagram illustrating an implementation of a management module, in accordance with some embodiments.

FIG. 2 is a block diagram illustrating a management module 121-1, in accordance with some embodiments, as shown in FIG. 1. Management module 121-1 typically includes one or more processing units (sometimes called CPUs or processors) 122-1 for executing modules, programs and/or instructions stored in memory 206 and thereby performing processing operations, memory 206 (sometimes called controller memory), and one or more communication buses 208 for interconnecting these components. The one or more communication buses 208 optionally include circuitry (sometimes called a chipset) that interconnects and controls communications between system components. Management module 121-1 is coupled to host interface 129, additional module(s) 125, and storage medium I/O 128 by the one or more communication buses 208.

Memory 206 includes high-speed random access memory, such as DRAM, SRAM, DDR RAM, or other random access solid state memory devices, and may include non-volatile memory, such as one or more magnetic disk storage devices, optical disk storage devices, flash memory devices, or other non-volatile solid state storage devices. Memory 206 optionally includes one or more storage devices remotely located from the CPU(s) 122-1. Memory 206, or alternatively the non-volatile memory device(s) within memory 206, comprises a non-transitory computer readable storage medium.

Figure 4:
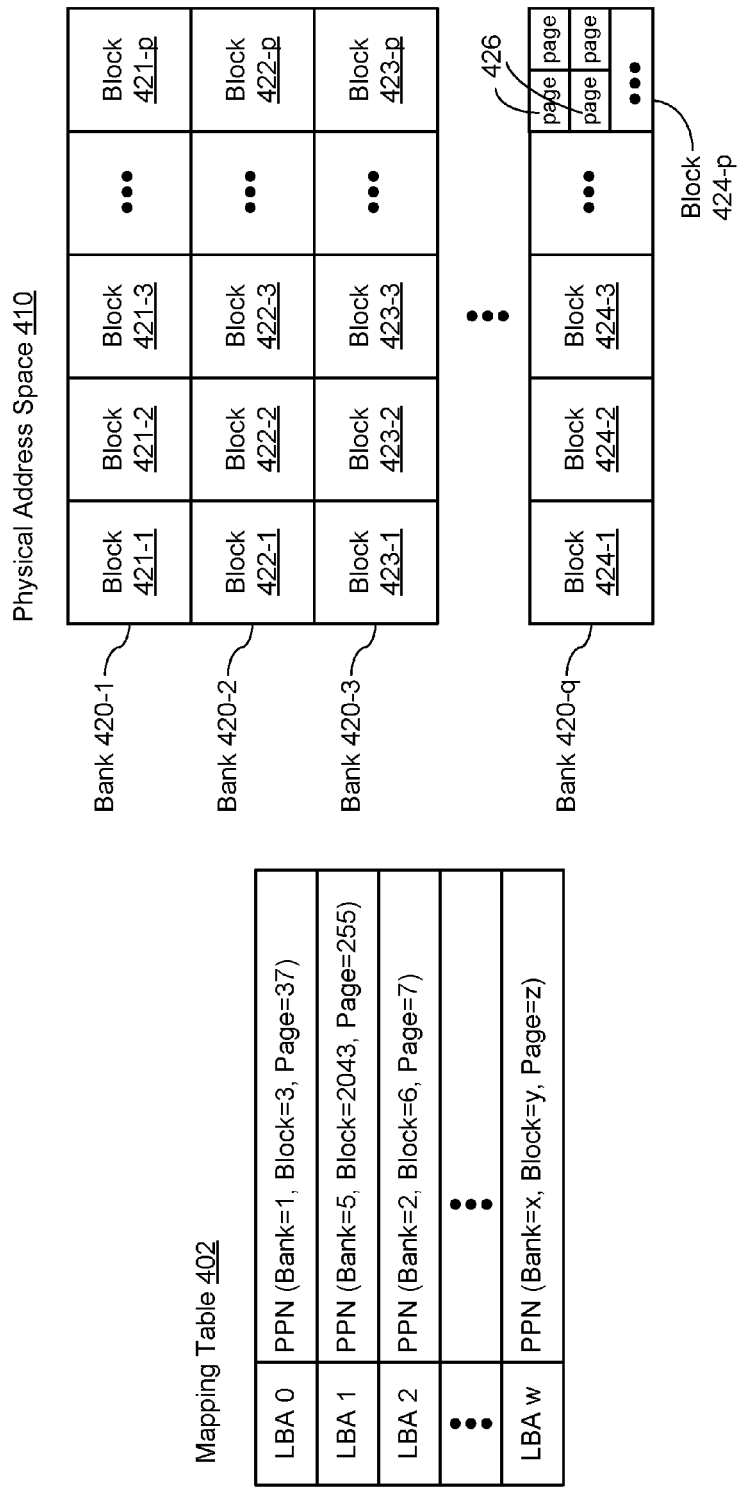
FIG. 4 is a block diagram of a mapping table and physical address space, in accordance with some embodiments.

In some embodiments, memory 206, or the non-transitory computer-readable storage medium of memory 206 stores the following programs, modules, and data structures, or a subset or superset thereof:

- translation table 212 that is used for mapping logical addresses to physical addresses (e.g., in some embodiments, translation table 212 includes mapping table 402, FIG. 4);
- data read module 214 that is used for reading data from one or more codewords, pages, or blocks in a storage medium (e.g., storage medium 132, FIG. 1);
- data write module 216 that is used for receiving write commands, writing data corresponding to the write commands to one or more codewords, pages, or blocks in a storage medium (e.g., storage medium 132, FIG. 1), and for determining whether processing a write command would reduce a quantity of unmapped storage units in a storage device to a quantity below one or more thresholds;
- data erase module 218 that is used for erasing data from one or more blocks in a storage medium (e.g., storage medium 132, FIG. 1);
- over-provisioning measurement module 220 that is used for measuring a level of over-provisioning in a storage device (e.g., storage device 120, FIG. 1);
- mode of operation module 224 that is used for configuring a storage device (e.g., storage device 120, FIG. 1) to operate in a particular mode of operation (modes of operation are discussed in more detail below in reference to FIGS. 5-10C);
- host messaging module 226 that is used for sending status messages to a host system (e.g., computer system 110, FIG. 1);
- mapping module 228 that is used for performing one or more operations related to a mapping table (e.g., translation table 212); and
- unmap module 230 that is used for determining a quantity of storage units in a storage device that are unmapped and is also used for performing one or more operations of an unmap process.

Each of the above-identified elements may be stored in one or more of the aforementioned memory devices, and corresponds to a set of instructions for performing a function described above. The above-identified modules or programs (i.e., sets of instructions) need not be implemented as separate software programs, procedures or modules, and thus various subsets of these modules may be combined or otherwise re-arranged in various embodiments. In some embodiments, memory 206 may store a subset of the modules and data structures identified above. Furthermore, memory 206 may store additional modules and data structures not described above. In some embodiments, the programs, modules, and data structures stored in memory 206, or the non-transitory computer readable storage medium of memory 206, provide instructions for implementing some of the methods described below. In some embodiments, some or all of these modules may be implemented with specialized hardware circuits that subsume part or all of the module functionality.

Although FIG. 2 shows management module 121-1 in accordance with some embodiments, FIG. 2 is intended more as a functional description of the various features which may be present in management module 121-1 than as a structural schematic of the embodiments described herein. In practice, and as recognized by those of ordinary skill in the art, the programs, modules, and data structures shown separately could be combined and some programs, modules, and data structures could be separated.

Figure 3:
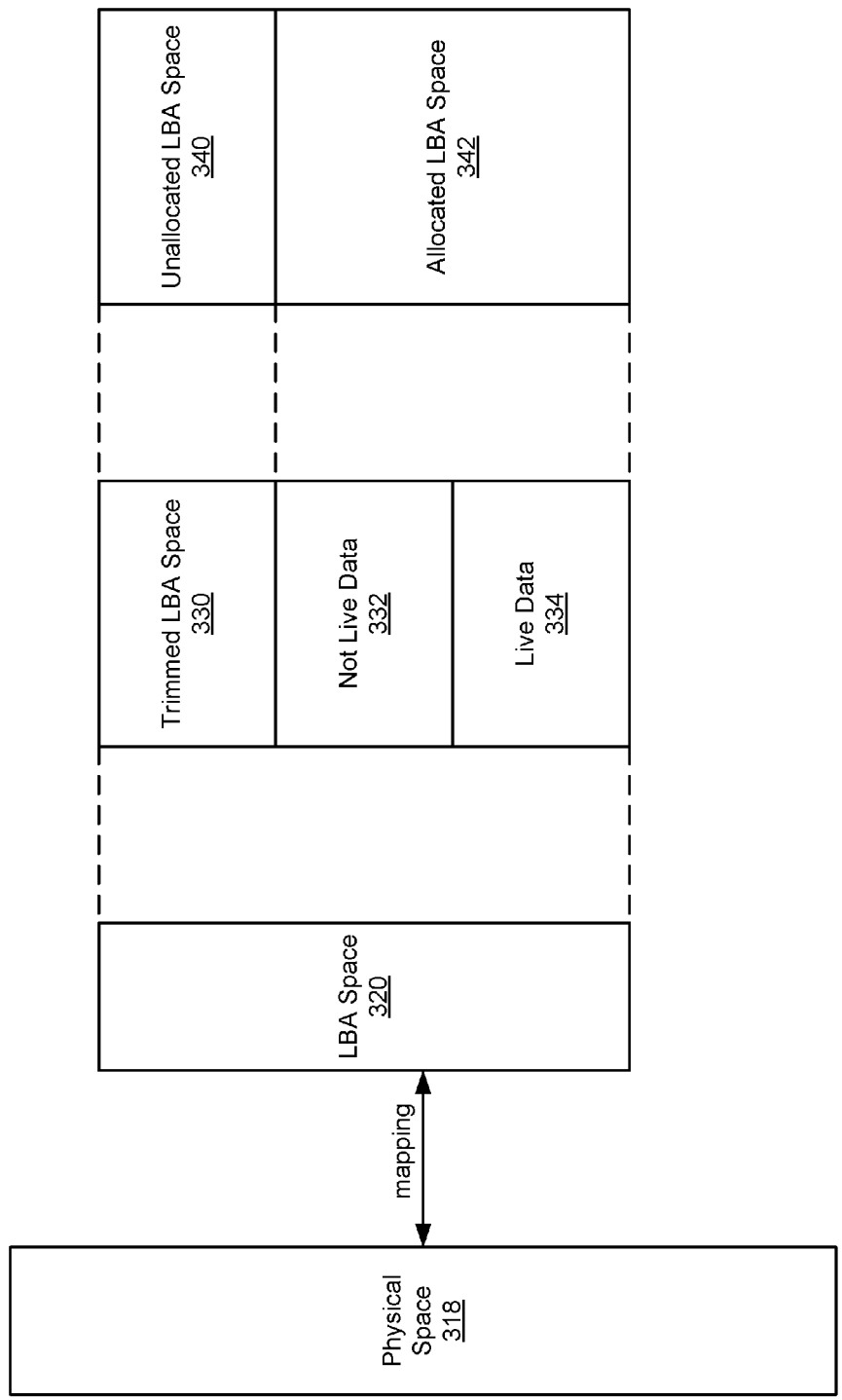
FIG. 3 is a block diagram of a logical address space, and, more specifically, a logical block address (LBA) space, in accordance with some embodiments.

FIG. 3 is a block diagram of a logical block address (LBA) space 320 (sometimes called logical address (LA) space), in accordance with some embodiments. In some embodiments, a logical address is the address at which an item (e.g., a file or other data) resides from the perspective of a host (e.g., computer system 110, FIG. 1). In some embodiments, a logical address (e.g., in LBA space 320) differs from a physical address (e.g., in physical space 318) due to the operation of a mapping function or address translator (e.g., a function or module that includes translation table 212, FIG. 2, or mapping table 402, FIG. 4). In some embodiments, logical addresses are implemented as logical block addresses (LBAs), which are mapped to physical flash addresses (e.g., physical page numbers (PPNs)). Physical addresses typically include portions, such as bank, block and page, corresponding to multiple levels of a memory hierarchy.

In some embodiments, a logical block address (LBA) is mapped to a physical flash address (e.g., a physical page number (PPN), including a bank, block, and page), as described further with respect to FIG. 4.

In some embodiments, a logical address space includes allocated logical address space (e.g., allocated LBA space 342) and unallocated logical address space (e.g., unallocated LBA space 340). In some embodiments, unallocated logical address space is logical address space at which no data is stored. In some embodiments, unallocated logical address space includes logical address space that has never been written to and/or has been discarded (previously written data may be discarded through a trim or unmap operation, and is sometimes called trimmed or unmapped logical address space). For example, in FIG. 3, unallocated LBA space 340 includes trimmed LBA space 330. In some embodiments, allocated logical address space is logical address space that was previously-written by a host, the previously-written data including data that is no longer used by a host (e.g., not live data 332) and data that is still in use by the host (e.g., live data 334). In some embodiments, not live data is data in a portion of the logical address space that is marked as free, available or unused in the metadata of a file system. Optionally, a file system may choose to convert not live address space into unallocated address space through a trim or unmap operation.

In FIG. 3, allocated LBA space 342 represents an amount of allocated space, and unallocated LBA space 340 represents an amount of unallocated space. However, neither allocated LBA space 342 nor unallocated LBA space 340 is necessarily a single contiguous region of LBA space 320. Similarly, live data 334 and not live data 332 in FIG. 3 represent amounts (e.g., counts of LBAs) of live data and not live data, respectively. However, neither live data 334 nor not live data 332 is necessarily a single contiguous region of LBA space 320 or allocated LBA space 342, nor do the positions of live data 334 and not live data 332 illustrated in FIG. 3 have any correlation to the logical or physical address values of the live data and not live data. Typically, live data 334 and/or not live data 332 will be present in multiple regions of LBA space 320, and are thus non-contiguous. Optionally, however, a remapping or coalescing process, which can also be called defragmentation, can be performed to consolidate some or all live data 334 into a contiguous region of LBA space 320.

Allocated logical address space (342) is space that is utilized. Typically, reducing the size of the allocated logical address space requires reducing the amount of live data 334 and/or not live data 332 stored by a storage device, or storage system, thereby converting a portion of the allocated logical address space into unallocated logical address space. In some embodiments, portions of not live data 332 are trimmed, and thereby converted into unallocated logical address space through the use of trim or unmap operations.

In some embodiments, physical storage units that correspond to the unallocated address space that was converted through unmap operations can be utilized to help extend the life of solid-state drives. As over-provisioning levels in a storage device become low (e.g., fall below a first threshold), the physical storage units that correspond to the unallocated address space can be used for execution of background memory operations, instead of forcing the storage device into an end-of-life state due to the low over-provisioning. These details are discussed in more detail below in reference to FIGS. 5-10C.

FIG. 4 is a block diagram of a mapping table 402 and physical address space 410, in accordance with some embodiments. In some embodiments, mapping table 402 contains multiple entries, wherein an entry of mapping table 402 is used to translate a logical address (e.g., a logical block address (LBA)) in a logical address space of a host (e.g., computer system 110, FIG. 1) to a physical address in a physical address space (e.g., physical address space 410) of non-volatile memory in a storage device (e.g., storage device 120, FIG. 1). In some embodiments, an LBA is the address of the smallest unit of stored data that is addressable by a host (e.g., 512 B or 4096 B). In some embodiments, LBAs are a sequence of integers organized in numerical order in the logical address space. In some embodiments, LBAs are integers chosen from a logical address space but need not be contiguous. For example, in implementations that utilize a sparse logical address space, the amount of addressable space is governed by a limit on the number of logical addresses that can be allocated, but those logical addresses are distributed over a larger address space than the maximum number of logical addresses that can be allocated (e.g., to a host or a set of hosts or clients).

In some embodiments, mapping table 402 is stored in memory associated with the storage device (e.g., in memory 206, as part of translation table 212, FIG. 2). In some embodiments, mapping table 402 is used to implement translation table 212 in management module 121-1 (FIG. 2). In some embodiments, a physical address is a physical page number (PPN), including a bank number, a block number, and a page number. In the example shown in FIG. 4, LBA 0 is mapped to bank 1 (e.g., Bank 420-1), block 3 (e.g., Block 421-3), page 37 (pages not shown in Block 421-3) of physical address space 410. FIG. 4 shows that physical address space 410 includes a plurality of non-volatile memory blocks 421, 422 423, 424. As described above, and as shown in the representation of block 424-$p$, each non-volatile memory block in the physical address space of a storage device typically includes a plurality of pages 426, where each page is typically an instance of the smallest individually accessible (e.g., readable or writable) portion of a block. Although FIG. 4 illustrates one example of a logical address to physical address mapping, in other embodiments, different mappings may be used. For example, in some embodiments, each of the logical address entries corresponds to multiple (e.g., eight) logical addresses (e.g., 8 LBAs per logical address entry). In some embodiments, mapping table 402 need not contain contiguous LBA addresses and may be organized in any manner that facilitates efficient lookup operations, e.g., hash table, binary tree, content addressable memory, and others.

In some embodiments, information stored in mapping tables (e.g., one or more forward and/or reverse mapping tables) is used to help a storage device monitor storage unit allocations. In some embodiments, storage unit allocations within a storage device (e.g., storage device 120, FIG. 1) are monitored by a management module of a storage controller (e.g., management module 121-1 of storage controller 124, FIGS. 1 and 2, respectively) in order to determine whether the storage device should be operated in a mode of operation that helps to extend its life. In some embodiments, the management module keeps track of (or is able to take ad-hoc measurements or make ad-hoc estimations of) mapped storage units, unmapped storage units, over-provisioned storage units, and bad blocks (also called blocks unusable for reliably storing data) within the storage device. In some embodiments, the management module compares one or more of the storage unit allocations for a particular storage device (typically over-provisioned storage units and/or unmapped storage units) to one or more thresholds in order to determine whether the particular storage device should be operated in the mode of operation that helps to extend its useful life (i.e., extend the amount of time that the storage device is able to accept and process write commands while continuing to reliably store existing data). With reference to FIG. 5 in conjunction with FIGS. 6A-6E, a prophetic graph and block diagrams, respectively, are used to illustrate storage unit allocations in a storage device and the use of thresholds to determine when to switch the storage device's mode of operation in order to help extend its useful life.

In particular, FIG. 5 is a simplified, prophetic diagram showing allocation of storage units (i.e., estimated numbers of mapped storage units, unmapped storage units, bad storage units, and over-provisioned storage units) in a storage device over time, in accordance with some embodiments. FIGS. 6A-6E are block diagrams showing allocation of storage units in a storage device at various times that correspond to the times shown in the prophetic diagram of FIG. 5, in accordance with some embodiments. The allocation of storage units shown in FIG. 5 and FIGS. 6A-6E progresses from an earlier time, $t_A$, to a later time, $t_E$, with times, $t_B$, $t_C$, $t_D$, occurring therebetween.

As shown in FIG. 5 and FIGS. 6A-6B, between $t_A$ and $t_B$, a number of mapped storage units remains relatively stable (e.g., mapped storage units 604A, FIG. 6A, approximately equal mapped storage units 604B, FIG. 6B), a number of unmapped storage units also remains relatively stable (e.g., unmapped storage units 606A, FIG. 6A, approximately equal unmapped storage units 606B, FIG. 6B), a number of bad blocks (i.e., blocks unusable for reliably storing data) increases slightly (e.g., bad blocks 610B, FIG. 6B, are slightly greater than bad blocks 610B, FIG. 6B), and a number of over-provisioned storage units decreases below a first threshold number of storage units (e.g., due to an increased number of bad blocks taking up over-provisioned space in the storage device, over-provisioning 608B, FIG. 6B, is slightly less than over-provisioning 608A, FIG. 6A). In some embodiments, in accordance with a determination that the number of over-provisioned storage units (i.e., a level of over-provisioning in the storage device) does not satisfy (e.g., is less than) the first threshold, the storage device's mode of operation is changed from a first (or default) mode of operation to a second mode of operation that protects the storage device while it has a low level of over-provisioning. While in the second mode of operation, the storage device continues to accept and process host write commands, but also closely monitors the number of unmapped storage units that are part of a declared storage capacity of the storage device, in order to ensure that the storage device is able to continue executing necessary background memory operations, such as garbage collection, so that the storage device can continue to perform reliably.

As shown in FIG. 5 and FIGS. 6B-6C, between $t_B$ and $t_C$, the number of mapped storage units continues to remain relatively stable (e.g., mapped storage units 604B, FIG. 6B, approximately equal mapped storage units 604C, FIG. 6C), the number of unmapped storage units drops below a second threshold number of storage units (e.g., unmapped storage units 606C, FIG. 6C falls below the second threshold), the number of over-provisioned storage units remains relatively stable below the first threshold (e.g., over-provisioning 608C, FIG. 6C, approximately equals over-provisioning 608B, FIG. 6B), and the number of bad blocks continues to increase (e.g., the decreased number of unmapped storage units is due to an increase in the number of bad blocks in the storage device; as shown in FIGS. 6B and 6C, the number of bad blocks 610C at time $t_C$ is greater than the number of bad blocks 610B at time $t_B$). In some embodiments, in accordance with a determination that the number of unmapped storage units does not satisfy (e.g., is less than) the second threshold, the storage device's mode of operation is changed from the second mode of operation to a third mode of operation in which the storage device forgoes accepting and processing host write commands.

In some embodiments, the storage device can return to a mode of operation in which the storage device is able to accept and process write commands from a host system. In some embodiments, the host system unmaps additional storage units at some point after $t_C$ and, therefore, at $t_D$, the number of unmapped storage units has increased above the second threshold (e.g., unmapped storage units 606D, FIG. 6D, are greater than unmapped storage units 606C, FIG. 6C), while the number of mapped storage units decreases (e.g., mapped storage units 604D, FIG. 6D, are less than mapped storage units 604C, FIG. 6C). In some embodiments, the increased number of unmapped storage units can be used for execution of background memory operations that require more space than is available in the reduced over-provisioning (i.e., even though over-provisioning 608C, FIG. 6C, and over-provisioning 608D, FIG. 6D, are at equally low levels, below the first threshold, the additional unmapped storage units are used as a substitute for over-provisioning, to provide space in which to perform background memory operations and, thereby, keep the storage device functioning and able to accept and process write commands). Therefore, in accordance with a determination that the number of unmapped storage units satisfies the second threshold (i.e., sufficient unmapped storage units are now available to offset the low level of over-provisioning), the storage device's mode of operation is changed back to the second mode of operation.

Figure 6E:
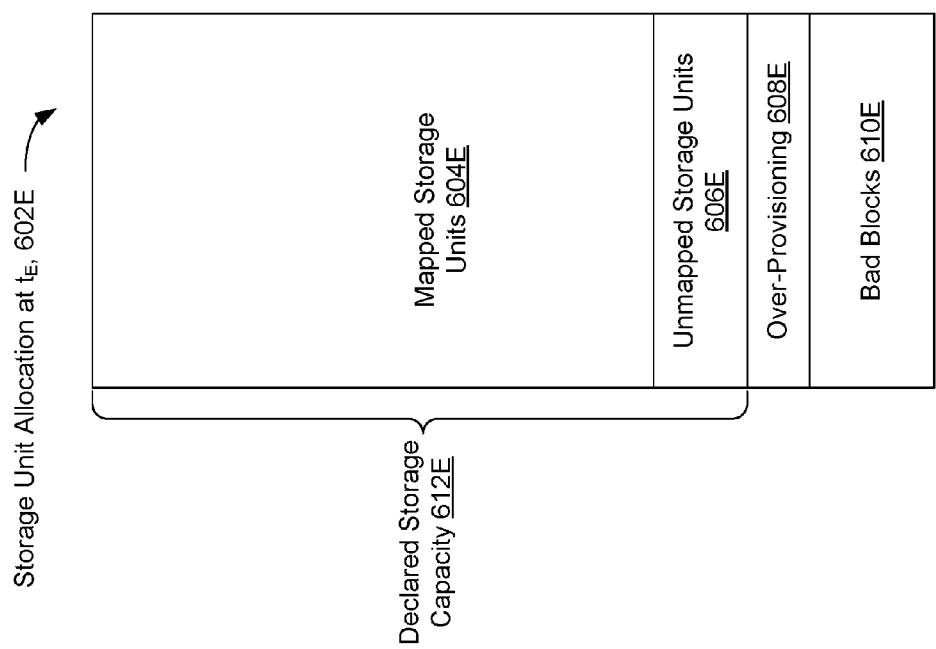

In some embodiments, the host system continues to unmap additional storage units (e.g., unmapped storage units 606E, FIG. 6E, are greater than unmapped storage units 606D, FIG. 6D and mapped storage units continue to reduce from 604D to 604E, FIGS. 6D and 6E, respectively), in order to compensate for a further reduction in the level of over-provisioning (e.g., over-provisioning 608E, FIG. 6E, is less than over-provisioning 608D, FIG. 6D, due in part to additional increases in the number of bad blocks from bad blocks 610D, FIG. 6D, to bad blocks 610E, FIG. 6E). In some circumstances, the storage device may then return to the first mode of operation (e.g., at $t_E$) in accordance with a determination that a combined number of storage units, comprising unmapped storage units that are in the declared storage capacity of the storage device in addition to over-provisioned storage units (e.g., combined number=over-provisioning 606E+unmapped storage units 606E) exceed the first threshold. Stated another way, the unmapped storage units that are part of the declared storage capacity of the storage device are utilized as a substitute form of over-provisioning to compensate for a low level of over-provisioning in the storage device, in order to ensure that the storage device has access to an acceptable number of usable storage units (e.g., unmapped storage units 606E in addition to over-provisioning 606E) to continue executing necessary background memory operations.

In some conventional non-volatile storage devices, the second and/or third modes of operation are not available (i.e., modes in which a number of unmapped storage units in a declared storage capacity of the storage device are monitored and later utilized to provide acceptable levels of over-provisioning for the storage device) and, therefore such storage devices are determined to have reached the end of their useful lives when over-provisioning falls below the first threshold (i.e., at or near at $t_B$, FIG. 5). Therefore, storage devices that are consistent with the embodiments disclosed herein remain in full service for a longer period of time when compared to these conventional embodiments.

Additional details regarding monitoring storage unit allocations and changing modes of operation to extend life of a storage device are provided below in reference to FIGS. 7-10C.

Figure 7:
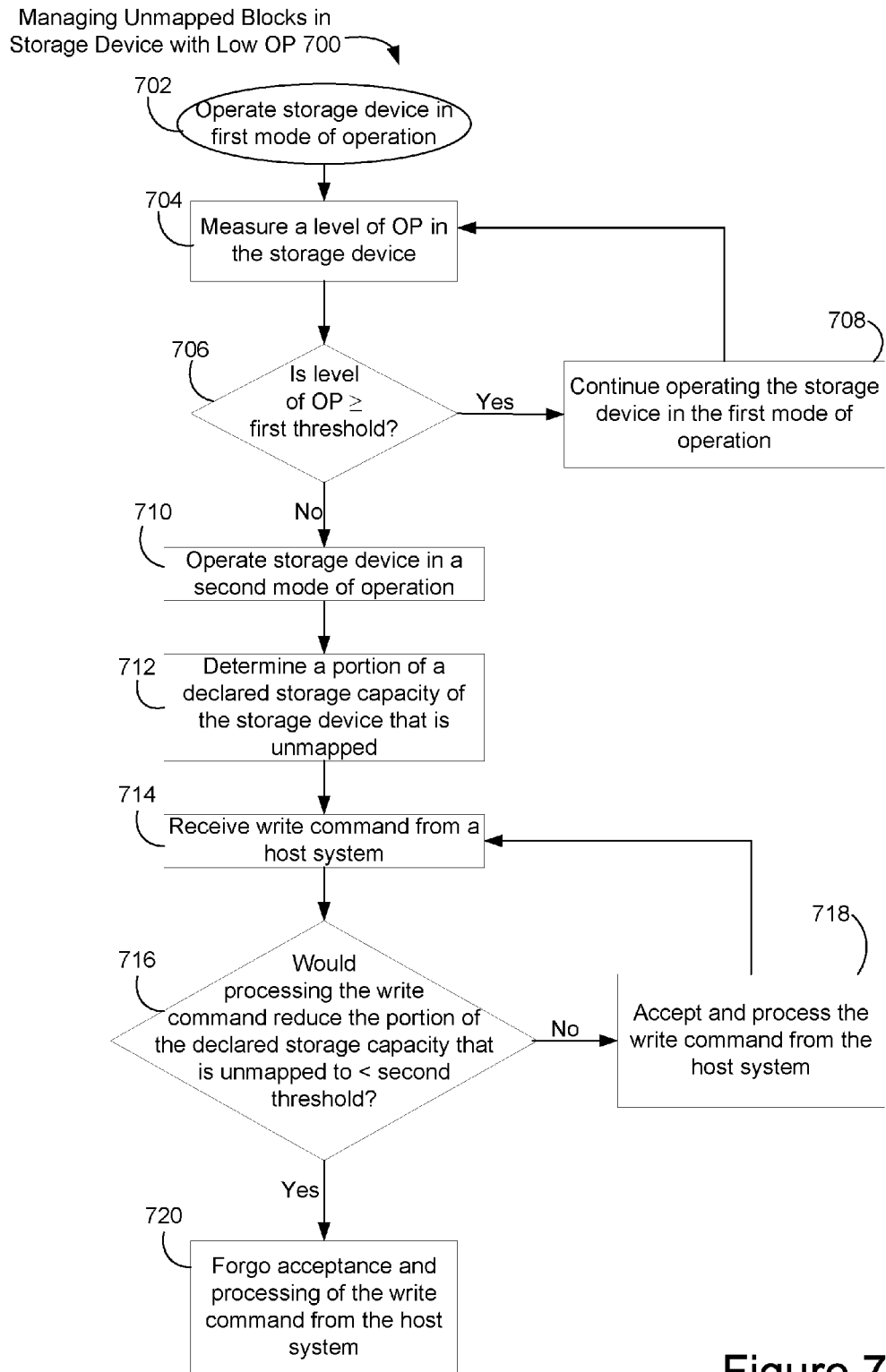
FIG. 7 illustrates a flowchart representation of a method of efficiently managing unmapped storage units in a storage device that has a low level of over-provisioning, in accordance with some embodiments.

FIG. 7 illustrates a flowchart representation of a method of efficiently managing unmapped storage units in a storage device that has low levels of over-provisioning, in accordance with some embodiments. With reference to the data storage system 100 pictured in FIG. 1, in some embodiments, a method 700 is performed by a storage device (e.g., storage device 120) or one or more components of the storage device (e.g., storage controller 124). In some embodiments, the method 700 is governed by instructions that are stored in a non-transitory computer-readable storage medium and that are executed by one or more processors of a device, such as the one or more processing units (CPUs) 122-1 of management module 121-1 (FIG. 2). In some embodiments, some of the operations of method 700 are performed at a host system (e.g., computer system 110) that is operatively coupled with the storage device and other operations of method 700 are performed at the storage device. In some embodiments, method 700 is governed, at least in part, by instructions that are stored in a non-transitory computer-readable storage medium and that are executed by one or more processors of the host system (the one or more processors of the host system are not shown in FIG. 1). For ease of explanation, the following describes method 700 as performed by the storage device (e.g., by storage controller 124 of storage device 120, FIG. 1). With reference to FIG. 2, in some embodiments, the operations of method 700 are performed, at least in part, by a data write module (e.g., data write module 216, FIG. 2), an over-provisioning measurement module (e.g., over-provisioning measurement module 222, FIG. 2), a mode of operation module (e.g., mode of operation module 224, FIG. 2), a host messaging module (e.g., host messaging module 226), a mapping module (e.g., mapping module 228), and/or an unmap module (e.g., unmap module 230) of management module 121-1.

The method 700 begins, in some embodiments, while the storage device (e.g., storage device 120, FIG. 1, or a component thereof such as mode of operation module 224, FIG. 2) operates (702) in a first mode of operation (e.g., a default or normal mode of operation for the storage device). The storage device measures (704) a level of over-provisioning in the storage device and conducts a first determination (706) to check whether the measured level of over-provisioning is less than a first threshold.

In accordance with the first determination indicating that the measured level of over-provisioning satisfies (i.e., is greater than or equal to) the first threshold (706—No), the storage device continues to operate (708) in the first mode of operation. While operating in the first mode of operation, the storage device continues to measure (704) the level of over-provisioning and continues to conduct the first determination (706) to ensure that the level of over-provisioning is above the first threshold. In some embodiments, the storage device conducts the first determination in response to receiving a write command from a host system (e.g., computer system 110, FIG. 1).

In accordance with the first determination instead indicating (or indicating at a later point in time) that the measured level of over-provisioning does not satisfy (e.g., is less than) the first threshold (706—No), the storage device is operated in a second mode of operation (710) in which over-provisioning levels and unmapped storage units in a declared capacity of the storage device are monitored in order to ensure that the storage device has sufficient space in which to execute background memory operations. In this way, the storage device is able to continue accepting and processing host write commands for a longer period of time (thereby extending useful life of the storage device as compared to storage devices that operate in only the first mode of operation before transitioning to a third, end-of-life, mode of operation).

While operating in the second mode of operation, the storage device determines (712) a portion of the declared storage capacity of the storage device that is unmapped. The storage device also receives (714) a write command from a host system and conducts a second determination (716) in order to check whether processing the write command would reduce the portion of the declared storage capacity that is unmapped to less than a second threshold. In accordance with the second determination indicating that processing the write command would not reduce the portion of the declared storage capacity that is unmapped to less than the second threshold (716—No), the storage device accepts and processes (718) the write command from the host system. Stated another way, while the storage device is operating in the second mode of operation and in response to receiving a host write command, the storage device checks to ensure that sufficient space (including over-provisioned storage units and unmapped storage units within the declared storage capacity of the storage device) will be available for background memory operations after processing the write command. The storage device then continues to receive (714) additional write commands from the host system and continues, for each additional write command, to conduct the second determination (716) in order to ensure that sufficient space will remain available for background memory operations after processing each additional write command.

In accordance with the second determination instead indicating (or indicating at a later point in time) that processing the write command would reduce the portion of the declared storage capacity that is unmapped to less than the second threshold (716—Yes), the storage device forgoes (720) acceptance and processing of the write command from the host system (e.g., the storage device operates in a third mode of operation in which the storage device forgoes acceptance and processing of write commands from the host system). In some embodiments, the storage device also sends status messages to the host system (e.g., after switching to the second and/or third modes of operation), requesting that the host system unmap additional storage units (discussed in more detail below in reference to FIGS. 8A-8C and 10A-10C). In this way, the storage device remains in full service for a longer period of time and also works with the host system to identify additional space that can be used to allow the storage device to continue accepting write commands for a longer period of time.

Additional details concerning each of the processing steps for method 700, as well as details concerning additional processing steps, are presented below with reference to FIGS. 8A-8C.

Figure 8A:
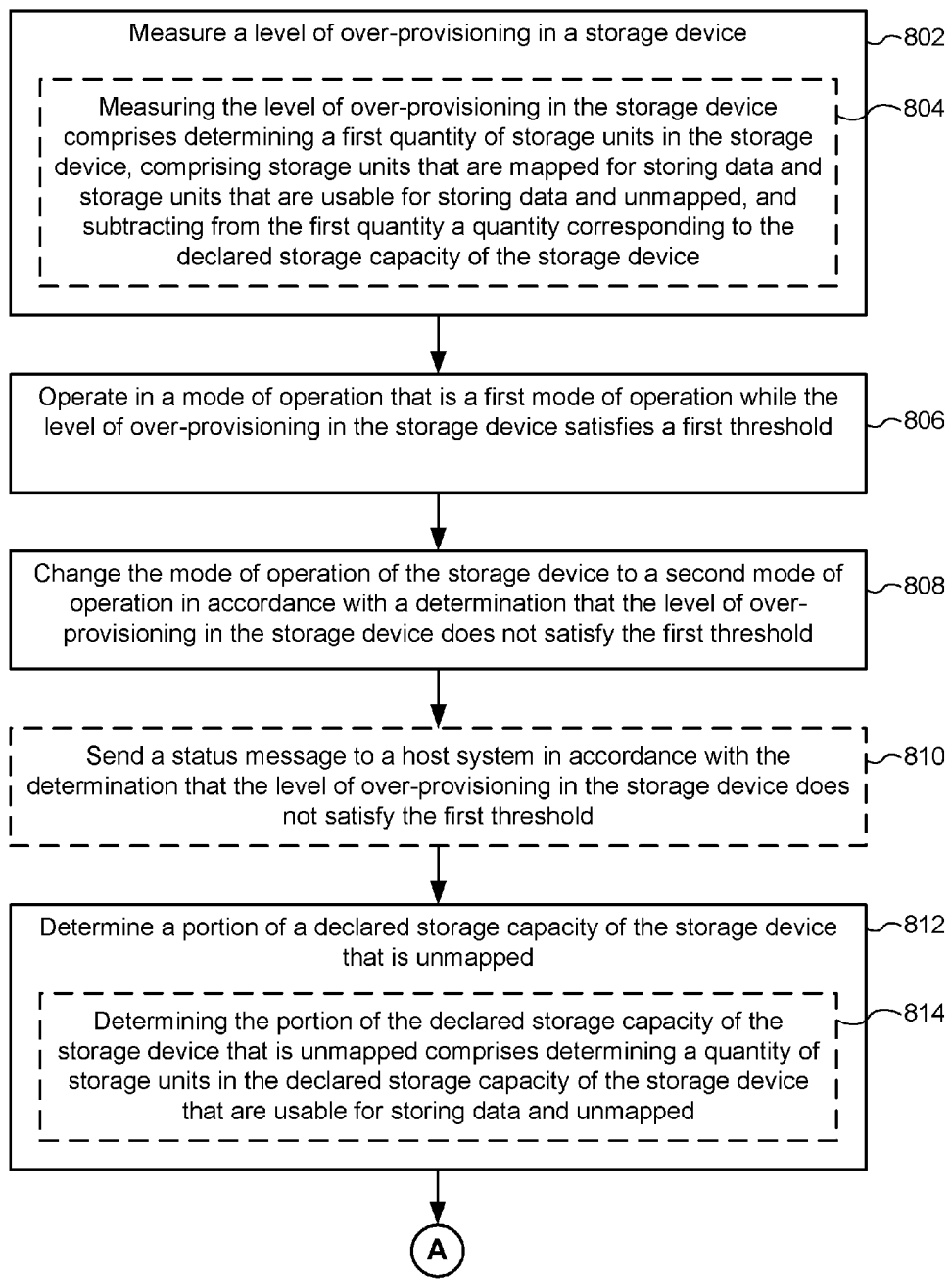
FIGS. 8A-8C illustrate a flowchart representation of a method of efficiently managing unmapped storage units in a storage device that has a low level of over-provisioning, in accordance with some embodiments.
Figure 8B:
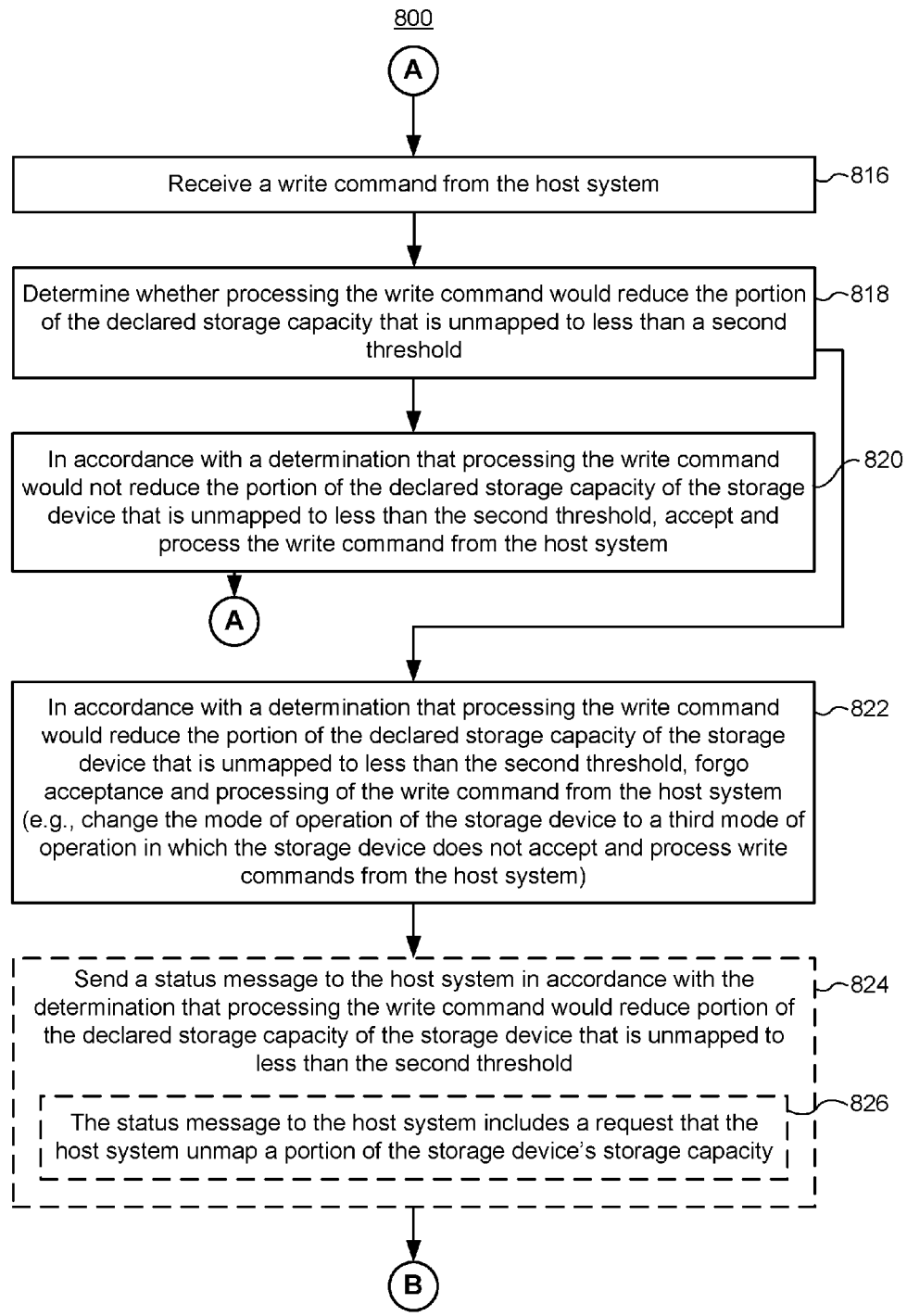
Figure 8C:
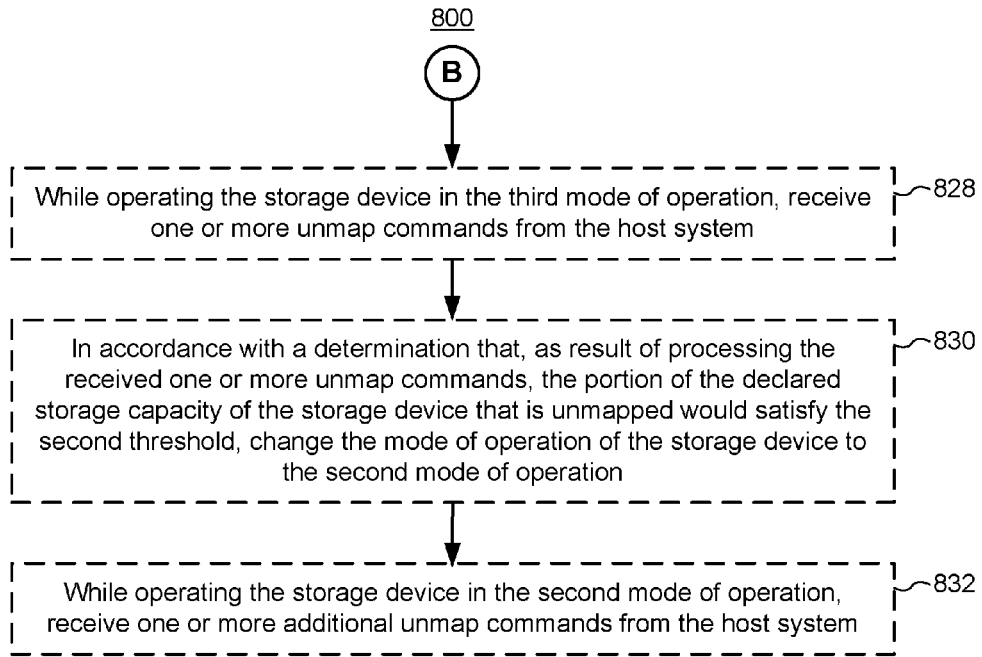

FIGS. 8A-8C illustrate a flowchart representation of a method of efficiently managing unmapped storage units in a storage device that has low levels of over-provisioning, in accordance with some embodiments. With reference to the data storage system 100 pictured in FIG. 1, in some embodiments, a method 800 is performed by a storage device (e.g., storage device 120) or one or more components of the storage device (e.g., storage controller 124). In some embodiments, the method 800 is governed by instructions that are stored in a non-transitory computer-readable storage medium and that are executed by one or more processors of a device, such as the one or more processing units (CPUs) 122-1 of management module 121-1 (FIG. 2). In some embodiments, some of the operations of method 800 are performed at a host system (e.g., computer system 110) that is operatively coupled with the storage device and other operations of method 800 are performed at the storage device. In some embodiments, method 800 is governed, at least in part, by instructions that are stored in a non-transitory computer-readable storage medium and that are executed by one or more processors of the host system (the one or more processors of the host system are not shown in FIG. 1). For ease of explanation, the following describes method 800 as performed by the storage device (e.g., by storage controller 124 of storage device 120, FIG. 1). With reference to FIG. 2, in some embodiments, the operations of method 800 are performed, at least in part, by a data write module (e.g., data write module 216, FIG. 2), an over-provisioning measurement module (e.g., over-provisioning measurement module 222, FIG. 2), a mode of operation module (e.g., mode of operation module 224, FIG. 2), a host messaging module (e.g., host messaging module 226), a mapping module (e.g., mapping module 228), and/or an unmap module (e.g., unmap module 230) of management module 121-1.

The method 800 begins, in some embodiments, when the storage device (e.g., storage device 120, FIG. 1, or a component thereof such as over-provisioning measurement module 222, FIG. 2) measures (802) a level of over-provisioning in the storage device. In some embodiments, measuring the level of over-provisioning in the storage device comprises determining (804) a first quantity of storage units in the storage device, comprising storage units that are mapped for storing data (e.g., mapped storage units 604A, FIG. 6A) and storage units that are usable for storing data and unmapped (e.g., unmapped storage units 606A+over-provisioning 608A), and subtracting from the first quantity a quantity corresponding to the declared storage capacity of the storage device (e.g., declared storage capacity 612A). Alternatively, or equivalently, measuring the level of over-provisioning in the storage device comprises determining a first quantity of storage units in the storage device, comprising storage units that are usable for storing data and unmapped (e.g., unmapped storage units 606A+over-provisioned storage units 608A), and subtracting from the first quantity a quantity of the unmapped storage units allocated to the declared storage capacity of the storage device (e.g., unmapped storage units 606A).

The storage device operates (806) in a mode of operation that is a first mode of operation while the level of over-provisioning in the storage device satisfies a first threshold (an exemplary first threshold is shown in FIG. 5). For example and with reference to FIG. 5, the storage device operates in the first mode of operation from a first time (e.g., $t_A$) until the level of over-provisioning falls below the first threshold at some point between the first time and a second time that after the first time (e.g., $t_B$). In some embodiments, the first threshold corresponds to a number of over-provisioned storage units required to continue processing required background memory operations that keep the storage device functioning with a required level of endurance (e.g., as defined by one or more quality of service metrics).

The mode of operation for the storage device is changed (808) to a second mode of operation (distinct from the first mode of operation) in accordance with a determination that the level of over-provisioning in the storage device does not satisfy the first threshold (e.g., a point in time between $t_A$ and $t_B$ at which the level of over-provisioning falls below the first threshold, FIG. 5). In some embodiments, the storage device optionally sends (810) a status message to the host system (e.g., using host messaging module 226, FIG. 2) in accordance with the determination that the level of over-provisioning in the storage device does not satisfy the first threshold.

The storage device additionally determines (812) a portion of a declared storage capacity of the storage device that is unmapped (e.g., unmapped storage units 606B is the portion of declared storage capacity 612B that is unmapped, FIG. 6B). In some embodiments, determining the portion of the declared storage capacity of the storage device that is unmapped comprises determining (814) a quantity of storage units in the declared storage capacity of the storage device that are usable for storing data (i.e., not bad blocks) and unmapped.

Turning now to FIG. 8B, while operating in the second mode of operation, the storage device receives (816) a write command from a host system (e.g., data write module 216 receives the write command from computer system 110, FIGS. 2 and 1, respectively) and determines (818) whether processing the write command would reduce the portion of the declared storage capacity that is unmapped to less than a second threshold (an exemplary second threshold is shown in FIG. 5). In other words, the decision to process write commands while in the second mode of operation is based on number of unmapped blocks that would remain after processing a respective write command.

In accordance with a determination that processing the write command would not reduce the portion of the declared storage capacity of the storage device that is unmapped to less than the second threshold, the storage device accepts and processes (820) the write command from the host system. In some embodiments, the storage device then continues to operate in the second mode of operation until the storage device determines that processing a particular write command from the host system would reduce the portion of the declared storage capacity of the storage device that is unmapped to less than the second threshold.

In accordance with a determination that processing the write command would reduce the portion of the declared storage capacity of the storage device that is unmapped to less than the second threshold, the storage device forgoes (822) acceptance and processing of the write command from the host system. For example and with reference to FIG. 5, the storage device receives the write command around a third time (e.g., $t_C$) and determines that processing the write command would reduce the portion of the declared storage capacity that is unmapped to less than the second threshold. Optionally, the storage device changes the mode of operation of the storage device to a third mode of operation in which the storage device does not accept and process write commands from the host system. In some embodiments, the third mode of operation is an end-of-life mode of operation, sometimes called a read-only mode of operation because the storage device accepts read commands, but not write commands, while in the third (or read-only) mode of operation. However, the term "read-only mode" is somewhat of a misnomer in this context, in that the storage device also accepts unmap commands in this mode of operation, and in some implementations accepts other commands besides read commands and unmap commands, but not write commands from the host system.

In other embodiments, the determination discussed above in reference to operation 818 (and in reference to FIG. 7 at 716) is performed without reference to a specific write command and is performed by comparing the number of unmapped blocks in the declared storage capacity of the storage device with the second threshold. In some of these other embodiments, the determination is performed at predefined time intervals (e.g., once per hour), after receiving a predefined number of write commands, or after writing a predefined amount of data. In these other embodiments, the storage device, while operating in the second mode of operation: (i) determines a portion of a declared storage capacity of the storage device that is unmapped (e.g., determining a quantity of erase blocks in the storage device that are usable for storing data and that are unmapped), (ii) in accordance with a determination that the portion of the declared storage capacity of the storage device that is unmapped satisfies (e.g., is greater than or equal to) the second threshold, accepts and processes write commands from a host system, and (iii) in accordance with a determination that the portion of the declared storage capacity of the storage device that is unmapped is less than the second threshold, changes the mode of operation of the storage device to the third mode of operation in which the storage device does not accept and process write commands from the host system.

In still other embodiments, the determination discussed above in reference to operation 818 (and in reference to operation 716 of FIG. 7) is based solely on the quantity of unmapped blocks (i.e., storage units) in the storage device as a whole, without regard to the portion of the declared storage capacity that remains unmapped. In these still other embodiments, the storage device, while operating in the second mode of operation: (i) determines a quantity of storage units in the storage device that are unmapped and usable for storing data; (ii) receives a write command from a host system; (iii) determines whether processing the write command would reduce the quantity of storage units in the storage device that are unmapped and usable for storage data to a quantity less than a second threshold; (iv) in accordance with a determination that processing the write command would not reduce the quantity of storage units in the storage device that are unmapped and usable for storing data to a quantity less than a second threshold, accepts and processes the write command from the host system; and (v) in accordance with a determination that processing the write command would reduce the quantity of storage units in the storage device that are unmapped and usable for storing data to a quantity less than the second threshold, forgoes acceptance and processing of the write command from the host system. Essentially, in these still other embodiments, all of the unmapped storage units that are usable for storing data are made available for the performance of background memory operations while the storage device is operating in the second mode of operation (i.e., unmapped storage units in the declared storage capacity of the storage device are used as a form of dynamic over-provisioning to address low levels of over-provisioning within the storage device). FIGS. 9 and 10A-10C provide additional details regarding some aspects of these still other embodiments.

Returning to the description of FIG. 8B, in some embodiments, the storage device sends (824) a status message to the host system in accordance with the determination (822) that processing the write command would reduce portion of the declared storage capacity of the storage device that is unmapped to less than the second threshold. Effectively, the status message tells the host system not to send any write commands, possibly other than overwrite commands, until the host has unmapped enough space to enable the storage device to return to the second mode of operation. In some embodiments, the status message is also sent in response to receiving any write command from the host system while the storage device is operating in the third mode of operation.

In some embodiments, the status message sent to the host system includes a request that the host system unmap a portion of the storage device's storage capacity (826). In some embodiments, the status message sent to the host system may specify a quantity of storage units, for example LBAs, pages, or blocks that need to be unmapped in order for the storage device to able to accept write commands from the host system. In this way, the host system is given a chance to free up additional space that can be used to perform background memory operations (as discussed above in reference to FIG. 5).

Turning now to FIG. 8C, while operating the storage device in the third mode of operation, the storage device receives (828) one or more unmap commands from the host system. For example, in response to the sending of the status message to the host system, the storage device receives the one or more unmap commands that reference specific logical address to be unmapped, which the storage device unmaps by updating an address translation table, so that the specified logical address is no longer mapped to a physical address, and marking the corresponding physical address(es) or physical storage unit(s) as having invalid data (sometimes called stale data). Continuing with the example, optionally, a count of unmapped memory portions (e.g., blocks or pages) is updated in accordance with the number of logical addresses that have been unmapped in response to the received unmap commands. In accordance with a determination that, as result of processing the received one or more unmap commands, the portion of the declared storage capacity of the storage device that is unmapped would satisfy the second threshold, the storage device changes (830) the mode of operation of the storage device to the second mode of operation.

For example and with reference to FIG. 5, between the third time and a fourth time (e.g., $t_D$), the storage device sends the status message to the host system and receives the one or more unmap commands in response. The storage device then conducts the determination of operation 830 and returns to the second mode of operation in accordance with the determination indicating that, as a result of processing the one or more unmap commands, the portion of the declared storage capacity of the storage device that is unmapped would satisfy the second threshold.

In some embodiments, or in some circumstances, while operating the storage device in the second mode of operation, the storage device receives (832) one or more additional unmap commands (e.g., from the host system). As a result, the number of unmapped storage units increases, and in some circumstances may even increase to a number that would satisfy the first threshold.

By requesting that the host system unmap storage units that are in the declared storage capacity of the storage device and then making those unmapped storage units available for processing background memory operations, the storage device is able to return to a mode of operation in which it is able to accept and process write commands (essentially returning from an end-of-life state back to an operational state). In some embodiments, the storage device does not return to the first mode of operation, regardless of how many storage units are unmapped as a result, and instead continues operating in the second mode of operation as long as a combined number of storage units, comprising unmapped storage units that are in the declared storage capacity of the storage device in addition to over-provisioned storage units (e.g., over-provisioning 608E+unmapped storage units 606E, FIG. 6E), remains above the second threshold. Some other embodiments, which respond differently to such circumstances, are described below with reference to FIGS. 9 and 10A-10C.

It should be understood that the particular order in which the operations in FIGS. 8A-8C have been described is merely exemplary and is not intended to indicate that the described order is the only order in which the operations could be performed. One of ordinary skill in the art would recognize various ways to reorder the operations and/or combine the operations with operations of other methods (e.g., methods 700, 900, and 1000) described herein.

As discussed above in reference to FIG. 1, instead of relying on a measured over-provisioning level, some embodiments determine only a quantity of unmapped storage units in the storage device (e.g., unmapped storage units that are in a declared storage capacity of the storage device in addition to over-provisioned storage units). As compared to methods 700 and 800, in some embodiments, methods 900 and 1000 (described below) do not require use of an over-provisioning measurement module (e.g., over-provisioning measurement module 222, FIG. 2). Instead, methods 900 and 1000 rely on a determined quantity of unmapped storage units (e.g., as determined by unmap module 230, FIG. 2) to decide when to operate the storage device in one or more modes of operation that are designed to extend life of the storage device (e.g., a second and a third mode of operation instead of a first or default mode of operation).

Figure 9:
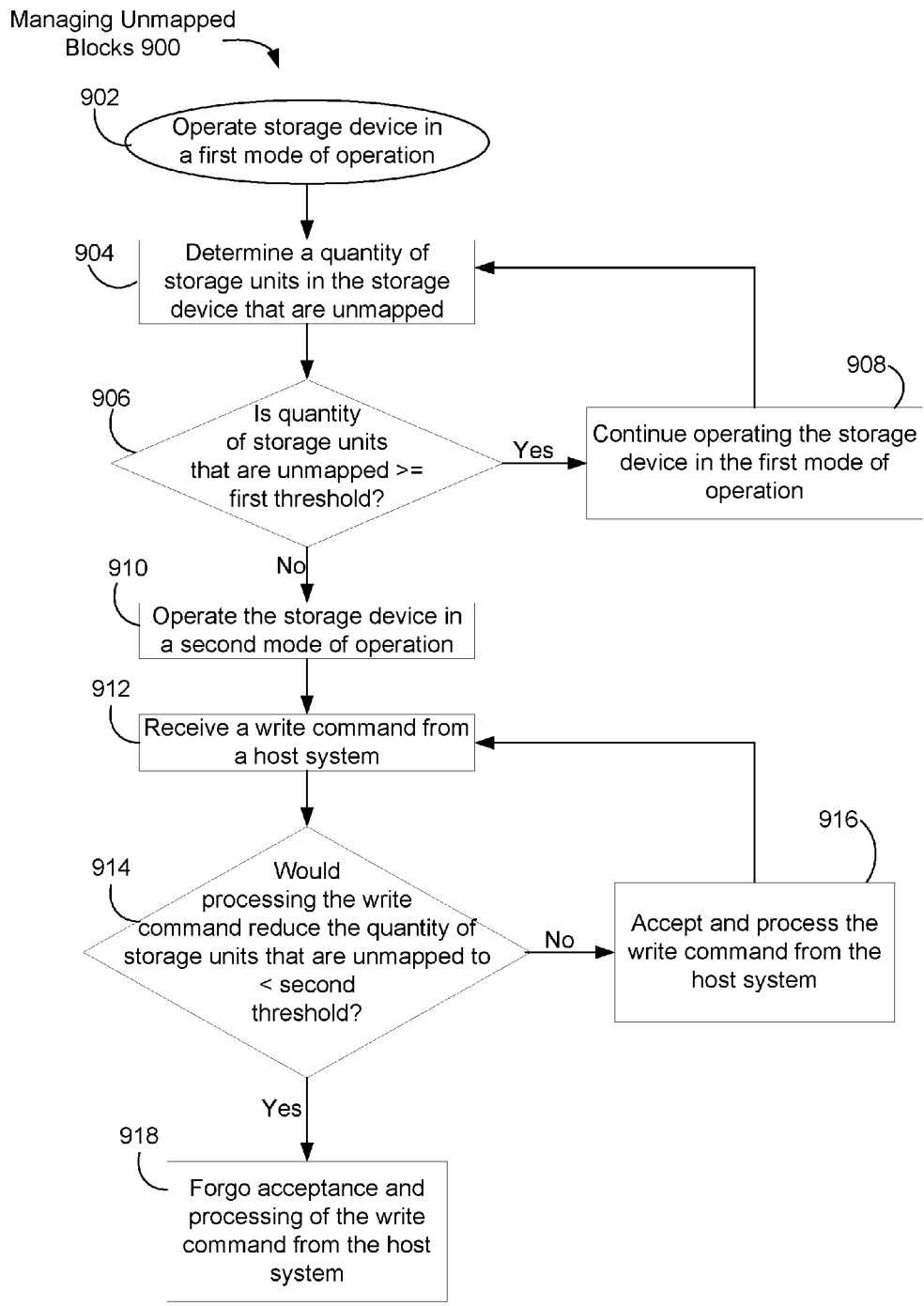
FIG. 9 illustrates a flowchart representation of a method of efficiently managing unmapped storage units to extend life of a solid-state drive, in accordance with some embodiments.

FIG. 9 illustrates a flowchart representation of a method of efficiently managing unmapped storage units to extend life of a solid-state drive, in accordance with some embodiments. With reference to the data storage system 100 pictured in FIG. 1, in some embodiments, a method 900 is performed by a storage device (e.g., storage device 120) or one or more components of the storage device (e.g., storage controller 124). In some embodiments, the method 900 is governed by instructions that are stored in a non-transitory computer-readable storage medium and that are executed by one or more processors of a device, such as the one or more processing units (CPUs) 122-1 of management module 121-1 (FIG. 2). In some embodiments, some of the operations of method 900 are performed at a host system (e.g., computer system 110) that is operatively coupled with the storage device and other operations of method 900 are performed at the storage device. In some embodiments, method 900 is governed, at least in part, by instructions that are stored in a non-transitory computer-readable storage medium and that are executed by one or more processors of the host system (the one or more processors of the host system are not shown in FIG. 1). For ease of explanation, the following describes method 900 as performed by the storage device (e.g., by storage controller 124 of storage device 120, FIG. 1). With reference to FIG. 2, in some embodiments, the operations of method 900 are performed, at least in part, by a data write module (e.g., data write module 216, FIG. 2), a mode of operation module (e.g., mode of operation module 224, FIG. 2), a host messaging module (e.g., host messaging module 226), a mapping module (e.g., mapping module 228), and/or an unmap module (e.g., unmap module 230) of management module 121-1.

The method 900 begins, in some embodiments, when the storage device (e.g., storage device 120, FIG. 1, or a component thereof such as mode of operation module 222, FIG. 2) operates (902) the storage device in a first mode of operation (e.g., a default or normal mode of operation for the storage device). The storage device determines (904) a quantity of storage units in the storage device that are unmapped and conducts a first determination as to whether the quantity of storage units that are unmapped satisfies (e.g., is greater than or equal to) a first threshold.

In accordance with the first determination indicating that the quantity of storage units in the storage device that are unmapped satisfies the first threshold (906—Yes), the storage device continues operating (908) in the first mode of operation and returns to operation 904. In some embodiments, the storage device returns to operation 904 in response to receiving a new write command from a host.

In accordance with the first determination instead indicating (or indicating at a later point in time) that the quantity of storage units in the storage device that are unmapped does not satisfy (e.g., is less than) the first threshold (906—No), the storage device is operated in the second mode of operation (910). The storage device then receives (912) a write command from a host system (e.g., computer system 110, FIG. 1) and conducts a second determination (914) as to whether processing the write command would reduce the quantity of storage units that are unmapped to a quantity that is less than a second threshold. In some embodiments, the second determination is conducted in response to receiving the write command from the host system.

In accordance with the second determination indicating that processing the write command would not reduce the quantity of storage units that are unmapped to a quantity that is less than the second threshold (914—No), the storage device accepts and processes (916) the write command from the host system. In some embodiments, the storage device then continues to receive additional write commands (912) and conducts the second determination (914) in response to receiving each additional write command.

In accordance with the second determination instead indicating that processing the write command would reduce the quantity of storage units that are unmapped to a quantity that is less than the second threshold (914—Yes), the storage device forgoes acceptance and processing (918) of the write command from the host system.

Additional details concerning each of the processing steps for method 900, as well as details concerning additional processing steps, are presented below with reference to FIGS. 10A-10C.

Figure 10A:
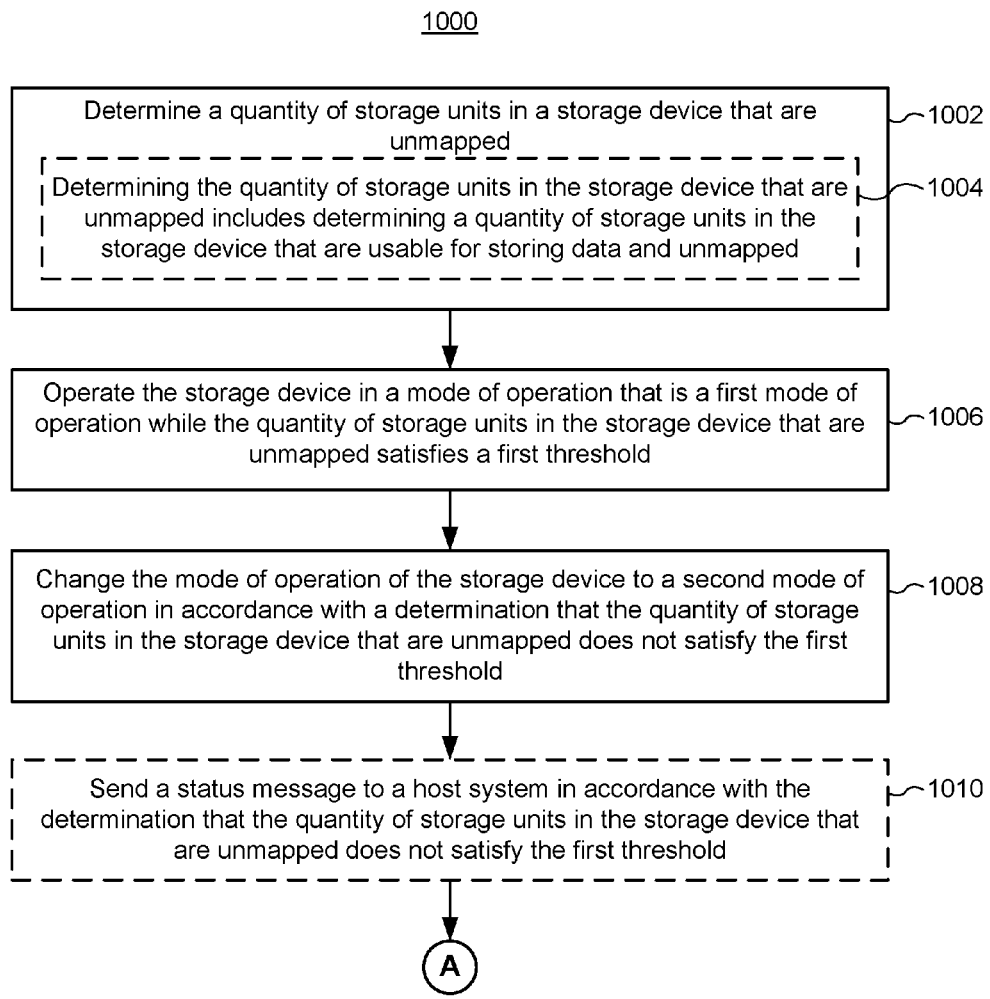
FIGS. 10A-10C illustrate a flowchart representation of a method of efficiently managing unmapped storage units to extend life of a solid-state drive, in accordance with some embodiments.
Figure 10B:
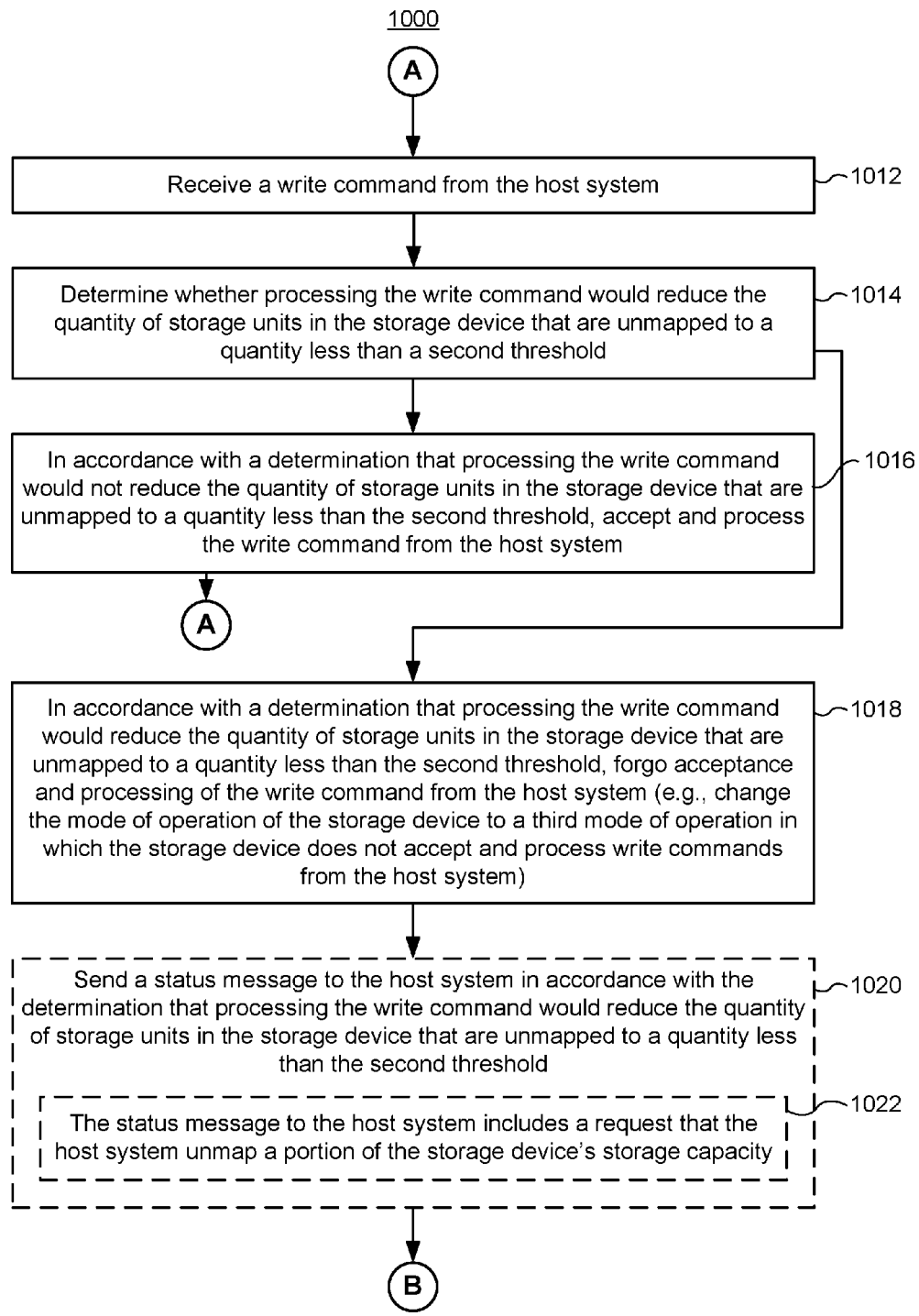
Figure 10C:
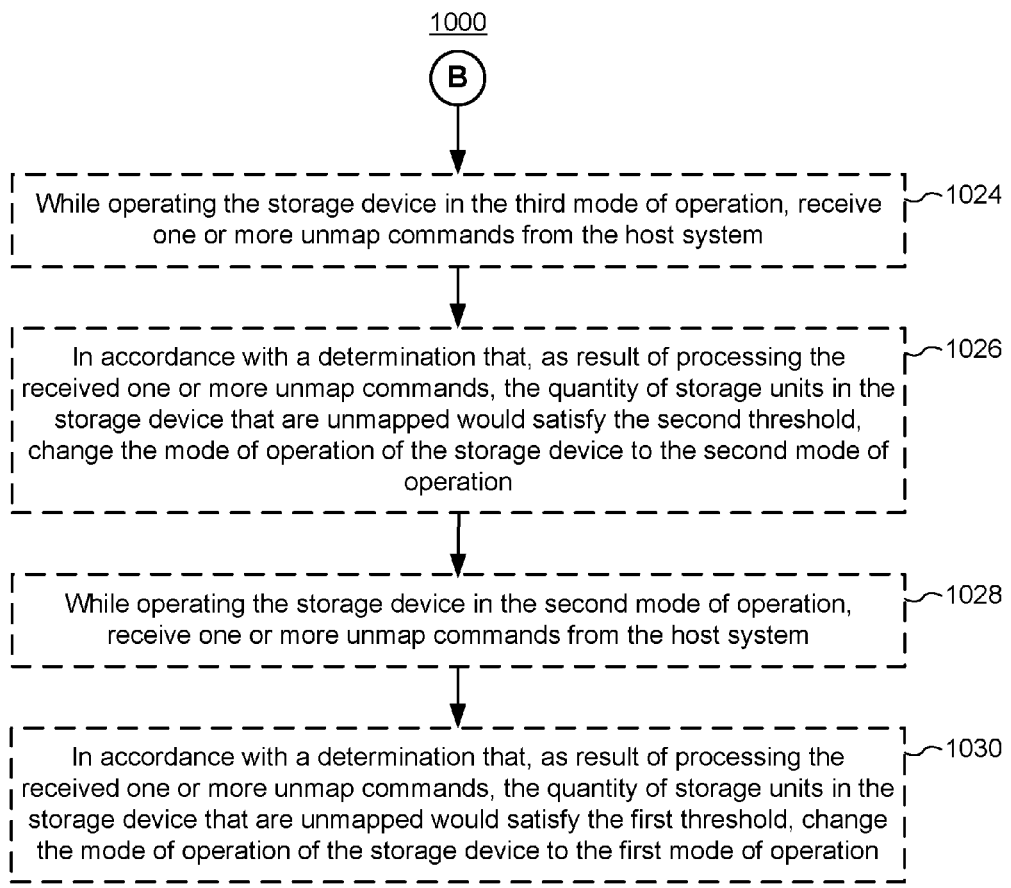

FIGS. 10A-10C illustrate a flowchart representation of a method of efficiently managing unmapped storage units to extend life of a solid-state drive, in accordance with some embodiments. With reference to the data storage system 100 pictured in FIG. 1, in some embodiments, a method 1000 is performed by a storage device (e.g., storage device 120) or one or more components of the storage device (e.g., storage controller 124). In some embodiments, the method 1000 is governed by instructions that are stored in a non-transitory computer-readable storage medium and that are executed by one or more processors of a device, such as the one or more processing units (CPUs) 122-1 of management module 121-1 (FIG. 2). In some embodiments, some of the operations of method 1000 are performed at a host system (e.g., computer system 110) that is operatively coupled with the storage device and other operations of method 1000 are performed at the storage device. In some embodiments, method 1000 is governed, at least in part, by instructions that are stored in a non-transitory computer-readable storage medium and that are executed by one or more processors of the host system (the one or more processors of the host system are not shown in FIG. 1). For ease of explanation, the following describes method 1000 as performed by the storage device (e.g., by storage controller 124 of storage device 120, FIG. 1). With reference to FIG. 2, in some embodiments, the operations of method 1000 are performed, at least in part, by a data write module (e.g., data write module 216, FIG. 2), a mode of operation module (e.g., mode of operation module 224, FIG. 2), a host messaging module (e.g., host messaging module 226), a mapping module (e.g., mapping module 228), and/or an unmap module (e.g., unmap module 230) of management module 121-1.

The method 1000 begins, in some embodiments, when the storage device (e.g., storage device 120, FIG. 1, or a component thereof such as unmap module 230, FIG. 2) determines (1002) a quantity of storage units in a storage device that are unmapped. In some embodiments, determining the quantity of storage units in the storage device that are unmapped includes determining (1004) a quantity of storage units in the storage device that are usable for storing data and unmapped. In some embodiments, this determination is made without respect to the level of over-provisioning in the storage device. That said, the quantity of storage units in the storage device that are usable for storing data and unmapped typically includes over-provisioned storage units (e.g., over-provisioning 608A, FIG. 6A) and unmapped storage units that are in the declared storage capacity of the storage device (e.g., unmapped storage units 606A that are part of declared storage capacity 612A, FIG. 6A).

The storage device is operated (1006) in a mode of operation that is a first mode of operation (e.g., a default or normal mode of operation) while the quantity of storage units in the storage device that are unmapped satisfies a first threshold. It is noted that the first threshold in method 1000 is not necessarily the same as the first threshold in method 800, as these are distinct methods. However, in some implementations, the first threshold of method 1000 is the same or similar to the first threshold of method 800.

In accordance with a determination that the quantity of storage units in the storage device that are unmapped does not satisfy the first threshold, the storage device's mode of operation is changed (1008) to a second mode of operation. In some embodiments, in accordance with the determination that the quantity of storage units in the storage device that are unmapped does not satisfy the first threshold, the storage device also sends (1010) a status message to a host system (e.g., computer system 110, FIG. 1). Effectively, this status message tells the host system that the storage device is nearing its effective limit for storing data, which may prompt the host to unmap additional storage units and/or move data from the storage device to another storage device.

Turning now to FIG. 10B, while operating in the second mode of operations, the storage device receives (1012) a write command from the host system and determines (1014) whether processing the write command would reduce the quantity of storage units in the storage device that are unmapped to a quantity less than a second threshold. In accordance with a determination that processing the write command would not reduce the quantity of storage units in the storage device that are unmapped to a quantity less than the second threshold, the storage device accepts and processes (1016) the write command from the host system. It is noted that the second threshold in method 1000 is not necessarily the same as the second threshold in method 800, as these are distinct methods. However, in some implementations, the second threshold of method 1000 is the same or similar to the second threshold of method 800. However, in method 800, the second threshold may be a function of the level of over-provisioning in the storage device, while in method 1000, the second threshold is independent of the level of over-provisioning in the storage device.

In accordance with a determination that processing the write command would reduce the quantity of storage units in the storage device that are unmapped to a quantity less than the second threshold, the storage device forgoes acceptance and processing (1018) of the write command from the host system. Furthermore, in some embodiments, the storage device's mode of operation is changed to a third mode of operation in which the storage device does not accept and process write commands from the host system. Optionally, the storage device also sends (1020) a status message to the host system in accordance with the determination that processing the write command would reduce the quantity of storage units in the storage device that are unmapped to a quantity less than the second threshold. In some embodiments, the status message to the host system includes a request that the host system unmap a portion of the storage device's storage capacity (e.g., declared storage capacity). In some embodiments, the status message may specify a quantity of storage, for example LBAs, pages, or blocks that need to be unmapped in order for the storage device to return to a mode of operation in which the storage device is able to accept and process write commands from the host system.

Turning now to FIG. 10C, while the storage device is operating in the third mode of operation, the storage device receives (1024) one or more unmap commands from the host system. For example, in response to the sending of the status message to the host system, the storage device receives the one or more unmap commands that reference specific logical addresses to be unmapped, which the storage device unmaps by updating an address translation table, so that the specified logical addresses are no longer mapped to physical addresses, and marking the corresponding physical addresses or physical storage units as having invalid data (sometimes called stale data). Continuing with the example, optionally, a count of unmapped memory portions (e.g., blocks or pages) is updated in accordance with the number of logical addresses that have been unmapped in response to the received unmap commands. In accordance with a determination that, as result of processing the received one or more unmap commands, the quantity of storage units in the storage device that are unmapped would satisfy the second threshold, the storage device's mode of operation is changed (1026) back to the second mode of operation.

In some embodiments, while operating the storage device in the second mode of operation, the storage device receives (1028) one or more additional unmap commands (e.g., from the host system). In accordance with a determination that, as result of processing the received one or more additional unmap commands, the quantity of storage units in the storage device that are unmapped would satisfy the first threshold, the storage device's mode of operation is changed (1030) to the first mode of operation.

It should be understood that the particular order in which the operations in FIGS. 10A-10C have been described is merely exemplary and is not intended to indicate that the described order is the only order in which the operations could be performed. One of ordinary skill in the art would recognize various ways to reorder the operations and/or combine the operations with operations of other methods (e.g., methods 700, 800, and 900) described herein. For example, in some embodiments, an alternative method is provided that starts with operations 802-810 (FIG. 8A) and then proceeds with operations 1012-1030 (FIGS. 10B-10C). In this way, the alternative method monitors a level of over-provisioning only until the level of over-provisioning is found to be below a first threshold (indicating that the level of over-provisioning is no longer sufficient to manage all background memory operations for the storage device). The alternative method then no longer keeps track of the level of over-provisioning as a separate measurement and, instead, only keeps track of/determines a quantity of unmapped storage units that are usable for storing data, in order to inform determinations as to whether the storage device's mode of operation should be changed.

It will be understood that, although the terms "first," "second," etc. may be used herein to describe various elements, these elements should not be limited by these terms. These terms are only used to distinguish one element from another. For example, a first region could be termed a second region, and, similarly, a second region could be termed a first region, without changing the meaning of the description, so long as all occurrences of the "first region" are renamed consistently and all occurrences of the "second region" are renamed consistently. The first region and the second region are both regions, but they are not the same region.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the phrase "at least one of A, B and C" is to be construed to require one or more of the listed items, and this phase reads on a single instance of A alone, a single instance of B alone, or a single instance of C alone, while also encompassing combinations of the listed items such "one or more of A and one or more of B without any of C," and the like.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method of managing a storage device that includes non-volatile memory, the method comprising:
   receiving write commands from a host system;
   determining a quantity of storage units in the storage device that are unmapped;
   operating the storage device in a mode of operation that is a first mode of operation while the quantity of storage units in the storage device that are unmapped satisfies a first threshold regardless of a level of overprovisioning in the storage device, wherein the quantity of storage units that are unmapped comprises unmapped storage units in a declared storage capacity and in over-provisioning space of the storage device;
   changing the mode of operation of the storage device to a second mode of operation in accordance with a determination that the quantity of storage units in the storage device that are unmapped does not satisfy the first threshold;
   while operating the storage device in the second mode of operation, for each write command received from the host system:
      determining whether processing the write command would reduce the quantity of storage units in the storage device that are unmapped to a quantity less than a second threshold;
      in accordance with a determination that processing the write command would not reduce the quantity of storage units in the storage device that are unmapped to a quantity less than the second threshold, accepting and processing the write command from the host system; and
      in accordance with a determination that processing the write command would reduce the quantity of storage units in the storage device that are unmapped to a quantity less than the second threshold, forgoing acceptance and processing of the write command from the host system.

2. The method of claim 1, further comprising:
   sending a status message to a host system in accordance with the determination that the quantity of storage units in the storage device that are unmapped does not satisfy the first threshold.

3. The method of claim 1, further comprising:
   sending a status message to a host system in accordance with the determination that processing the write command would reduce the quantity of storage units in the storage device that are unmapped to a quantity less than the second threshold.

4. The method of claim 3, wherein the status message to the host system comprises a request that the host system unmap a portion of the storage device's storage capacity.

5. The method of claim 1, wherein forgoing acceptance and processing of the write command from the host system includes changing the mode of operation of the storage device to a third mode of operation in which the storage device does not accept and process write commands from the host system.

6. The method of claim 5, further comprising:
   while operating the storage device in the third mode of operation, receiving one or more unmap commands from the host system; and
   in accordance with a determination that, as result of processing the received one or more unmap commands, the quantity of storage units in the storage device that are unmapped would satisfy the second threshold, changing the mode of operation of the storage device to the second mode of operation.

7. The method of claim 1, further comprising:
   while operating the storage device in the second mode of operation, receiving one or more unmap commands; and
   in accordance with a determination that, as a result of processing the received one or more unmap commands, the quantity of storage units in the storage device that are unmapped would satisfy the second threshold, changing the mode of operation of the storage device to the first mode of operation.

8. The method of claim 1, wherein determining the quantity of storage units in the storage device that are unmapped includes determining a quantity of storage units in the storage device that are usable for storing data and unmapped.

9. A storage device, comprising:
   non-volatile memory;
   one or more processors; and
   a storage controller, the storage controller configured to:
      receive write commands from a host system;
      determine a quantity of storage units in the storage device that are unmapped;
      operate the storage device in a mode of operation that is a first mode of operation while the quantity of storage units in the storage device that are unmapped satisfies a first threshold regardless of a level of overprovisioning in the storage device, wherein the quantity of storage units that are unmapped comprises unmapped storage units in a declared storage capacity and in over-provisioning space of the storage device;

change the mode of operation of the storage device to a second mode of operation in accordance with a determination that the quantity of storage units in the storage device that are unmapped does not satisfy the first threshold;

while operating the storage device in the second mode of operation, for each write command received from the host system:

determine whether processing the write command would reduce the quantity of storage units in the storage device that are unmapped to a quantity less than a second threshold;

in accordance with a determination that processing the write command would not reduce the quantity of storage units in the storage device that are unmapped to a quantity less than a second threshold, accept and process the write command from the host system; and in accordance with a determination that processing the write command would reduce the quantity of storage units in the storage device that are unmapped to a quantity less than a second threshold, forgo acceptance and processing of the write command from the host system.

10. The storage device of claim 9, wherein the controller is further configured to:

determine the quantity of storage units in the storage device that are unmapped;

operate the storage device in a mode of operation that is a first mode of operation while the quantity of storage units in the storage device that are unmapped satisfies a first threshold and change the mode of operation to a second mode of operation in accordance with a determination that the quantity of storage units in the storage device that are unmapped does not satisfy the first threshold; and the controller is further configured to:
(i) receive the write command from the host system;
(ii) determine whether processing the write command would reduce the quantity of storage units in the storage device that are unmapped to a quantity less than a second threshold;
(iii) accept and process the write command from the host system in accordance with the determination that processing the write command would not reduce the quantity of storage units in the storage device that are unmapped to a quantity less than the second threshold; and
(iv) forgo acceptance and processing of the write command from the host system in accordance with the determination that processing the write command would reduce the quantity of storage units in the storage device that are unmapped to a quantity less than the second threshold.

11. The storage device of claim 9, wherein the controller is configured to send a status message to the host system in accordance with the determination that the quantity of storage units in the storage device that are unmapped does not satisfy the first threshold.

12. The storage device of claim 9, wherein the controller is configured to send a status message to the host system in accordance with the determination that processing the write command would reduce the quantity of storage units in the storage device that are unmapped to a quantity less than the second threshold.

13. The storage device of claim 12, wherein the status message to the host system comprises a request that the host system unmap a portion of the storage device's storage capacity.

14. The storage device of claim 9, wherein to forgo acceptance and processing of the write command from the host system the controller is further configured to change the mode of operation of the storage device to a third mode of operation in which the storage device does not accept and process write commands from the host system.

15. The storage device of claim 14, wherein the controller is further configured to:

while operating the storage device in the third mode of operation, receive one or more unmap commands from the host system; and in accordance with a determination that, as result of processing the received one or more unmap commands, the quantity of storage units in the storage device that are unmapped would satisfy the second threshold, change the mode of operation of the storage device to the second mode of operation.

16. The storage device of claim 9, wherein the controller is further configured to:

while operating the storage device in the second mode of operation, receive one or more unmap commands; and in accordance with a determination that, as a result of processing the received one or more unmap commands, the quantity of storage units in the storage device that are unmapped would satisfy the second threshold, changing the mode of operation of the storage device to the first mode of operation.

17. The storage device of claim 9, wherein determining the portion of the declared storage capacity of the storage device that is unmapped comprises determining a quantity of storage units in the storage device that are usable for storing data and unmapped.

18. A non-transitory computer readable storage medium, storing one or more programs configured for execution by one or more processors of a storage device, the one or more programs including instructions that, when executed by the one or more processors of the storage device, cause the storage device to:

receive write commands from a host system;

determine a quantity of storage units in the storage device that are unmapped;

operate the storage device in a mode of operation that is a first mode of operation while the quantity of storage units in the storage device that are unmapped satisfies a first threshold regardless of a level of overprovisioning in the storage device, wherein the quantity of storage units that are unmapped comprises unmapped storage units in a declared storage capacity and in over-provisioning space of the storage device;

change the mode of operation of the storage device to a second mode of operation in accordance with a determination that the quantity of storage units in the storage device that are unmapped does not satisfy the first threshold;

while operating the storage device in the second mode of operation, for each write command received from the host system:

determine whether processing the write command would reduce the quantity of storage units in the storage device that are unmapped to a quantity less than a second threshold;

in accordance with a determination that processing the write command would not reduce the quantity of storage units in the storage device that are unmapped to a quantity less than a second threshold, accept and process the write command from the host system; and in accordance with a determination that processing the write command would reduce the quantity of storage units in the storage device that are unmapped to a quantity less than a second threshold, forgo acceptance and processing of the write command from the host system.

19. The non-transitory computer readable storage medium of claim 18, wherein the one or more programs include:

an unmap program containing processor executable instructions for determining the quantity of storage units in the storage device that are unmapped;

a mode of operation program containing processor executable instructions for (i) operating the storage device in a mode of operation that is a first mode of operation while the quantity of storage units in the storage device that are unmapped satisfies a first threshold and (ii) changing the mode of operation to a second mode of operation in accordance with a determination that the quantity of storage units in the storage device that are unmapped does not satisfy the first threshold; and a data write program containing processor executable instructions for:
  (i) receiving the write command from the host system;
  (ii) determining whether processing the write command would reduce the quantity of storage units in the storage device that are unmapped to a quantity less than a second threshold;
  (iii) accepting and processing the write command from the host system in accordance with the determination that processing the write command would not reduce the quantity of storage units in the storage device that are unmapped to a quantity less than the second threshold; and
  (iv) forgoing acceptance and processing of the write command from the host system in accordance with the determination that processing the write command would reduce the quantity of storage units in the storage device that are unmapped to a quantity less than the second threshold.

20. The non-transitory computer readable storage medium of claim 18, wherein the one or more programs include a host messaging program containing processor executable instructions for sending a status message to the host system in accordance with the determination that the quantity of storage units in the storage device that are unmapped does not satisfy the first threshold.

* * * * *